United States Patent [19]
Yamaguchi

[11] Patent Number: 5,812,178
[45] Date of Patent: Sep. 22, 1998

[54] METHOD FOR ADJUSTING GRAY BALANCE IN PHOTO PRINTERS

[75] Inventor: Hiroshi Yamaguchi, Kanagawa-ken, Japan

[73] Assignee: Fuji Photo Film Co., Ltd., Kanagawa-ken, Japan

[21] Appl. No.: 713,611

[22] Filed: Sep. 13, 1996

[30] Foreign Application Priority Data

Sep. 14, 1995 [JP] Japan ................................. 7-236589

[51] Int. Cl.$^6$ ................................................. H04N 1/56
[52] U.S. Cl. ...................... 347/251; 347/232; 358/519; 358/520
[58] Field of Search .................................. 347/240, 251, 347/254, 131, 232; 382/167, 169, 276; 358/518, 519, 520, 530, 531

[56] References Cited

U.S. PATENT DOCUMENTS

| 5,181,105 | 1/1993 | Udagawa et al. ...................... 356/520 |
| 5,296,946 | 3/1994 | Kadowaki et al. ..................... 358/531 |

Primary Examiner—N. Le
Assistant Examiner—Hai Pham

[57] ABSTRACT

In a photo printer, signal components D1', D2', and D3' representing low-saturation picture elements are obtained from image signals D1, D2, and D3. Shadow points D1s, D2s, and D3s and highlight points D1h, D2h, and D3h in the signal components D1', D2', and D3' are calculated. A set of signal components (D1", D2") is obtained by grouping signal component pairs (D1', D2'), each of which corresponds to a single picture element, and in which the signal components, each constituting one of counterparts in each pair, have an identical value, and replacing the signal components, each of which constitutes the other counterpart in each of the grouped pairs, by their mean value. A calculation is made to find the relationship between the densities of two colors from the set of the signal components (D1", D2"), the shadow points (D1s, D2s), and the highlight points (D1h, D2h). A linear transform is carried out on at least either one of the image signals D1 and D2 in accordance with the calculated relationship, such that the one of the image signals D1 and D2 may become identical with the other image signal over its entire range. The image signals D1, D2, and D3 are thereby adjusted such that their signal components corresponding to a gray object may represent an identical density.

30 Claims, 11 Drawing Sheets

F I G. 4
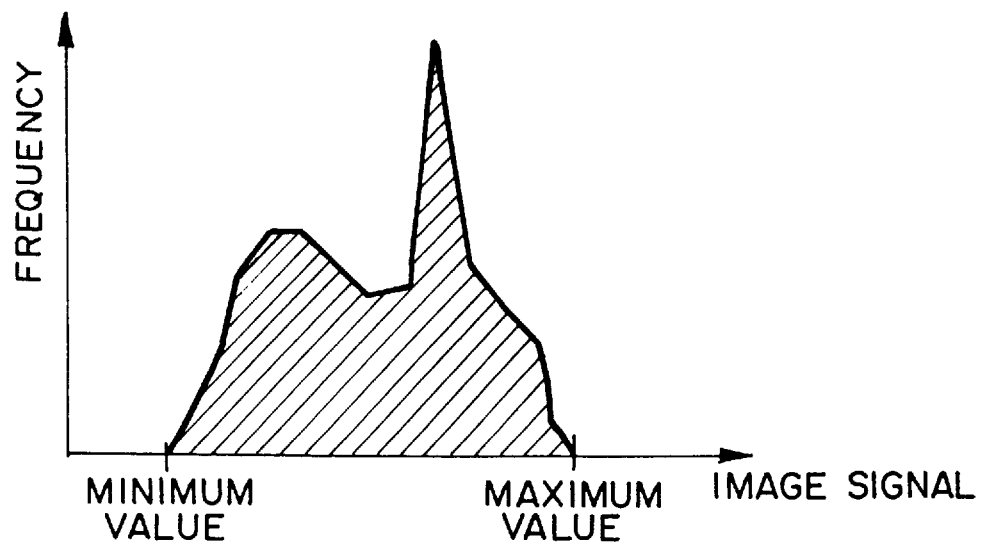
F I G. 5
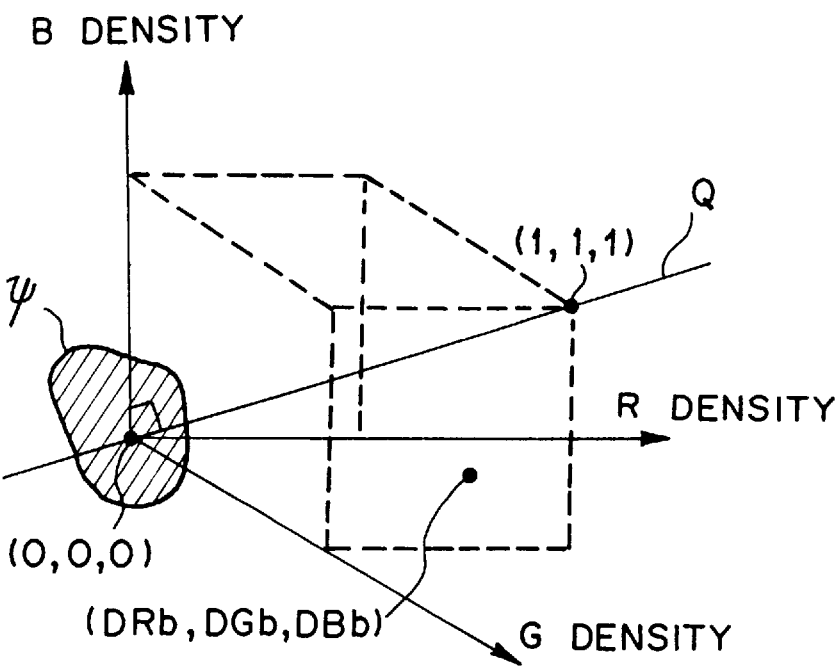

GROUP OF HIGH-SATURATION PICTURE ELEMENTS

F I G. 11
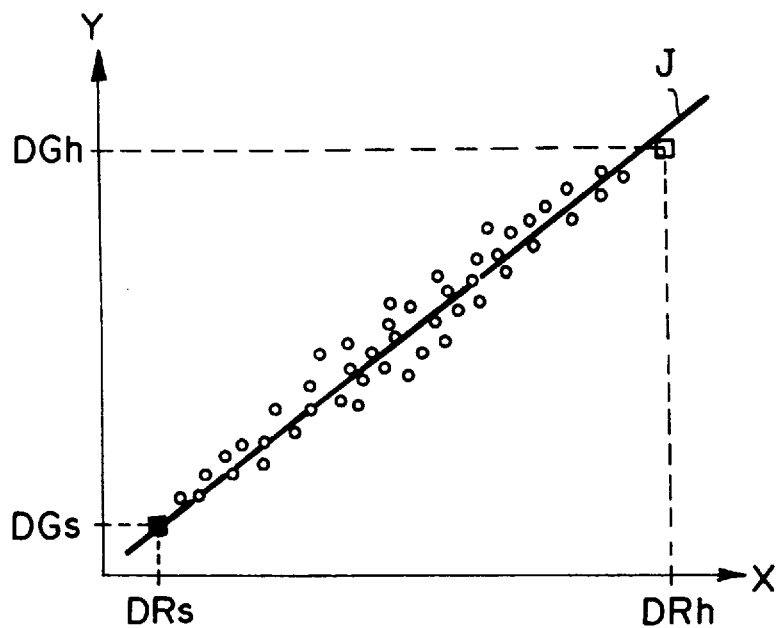
F I G. 12
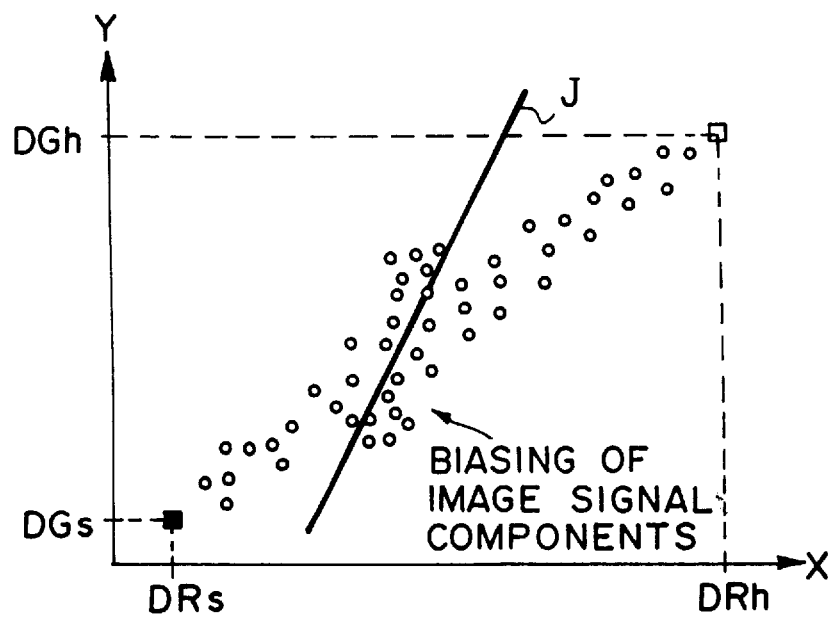

METHOD FOR ADJUSTING GRAY BALANCE IN PHOTO PRINTERS

BACKGROUND OF THE INVENTION

1. Field of the Invention

This invention relates to a method for adjusting gray balance in a photo printer, wherein three color image signals, which have been obtained by reading out an image recorded on color film, are adjusted such that their image signal components corresponding to a gray object may represent an identical density.

2. Description of the Background Art

There have heretofore been known photo printers, wherein image signals respectively made up of series of image signal components, which represent red (R), green (G), and blue (B) three color densities at picture elements of an image, are obtained by reading out the image recorded on color film, each of three color light beams is modulated with one of the image signals and caused to scan on a color photosensitive material, and a color image is thereby reproduced on the color photosensitive material. One example of the photo printers is described in Japanese Unexamined Patent Publication No. 6(1994)-233052.

In the photo printers of this type, the problems often occur in that the gray balance is lost, i.e. in that an actually gray (achromatic-color) object is reproduced as an image pattern tinted with a certain color on the photosensitive material. Basically, the image signal components of R, G, and B image signals, which image signal components correspond to a gray object, should represent an identical density. However, they cannot represent an identical density due to the reasons described below, and therefore the aforesaid problems occur.

Specifically, in general, sheets of ordinary color negative film are subjected to printing operations using a surface exposure system. Therefore, in order for the density to be adjusted with the exposure amount during the printing operations with the surface exposure systems, ordinary color negative film is designed such that the cyan (C), magenta (M), and yellow (Y) dye densities may have predetermined differences among them with respect to gray exposure. Accordingly, when reading light, which has passed through the color negative film is detected and the R, G, and B image signals are thereby obtained, the image signal components of the R, G, and B image signals, which image signal components correspond to a gray object, do not represent an identical density.

If the differences among the C, M, and Y dye densities described above are found, the gray balance can be kept by correcting the R, G, and B image signals in accordance with the found differences among the C, M, and Y dye densities. However, as illustrated in FIGS. 13A and 13B, the differences among the C, M, and Y dye densities formed with gray exposure vary for different kinds of film. The differences among the C, M, and Y dye densities formed with gray exposure also vary for different conditions, under which the developing process is carried out. Further, the differences among the C, M, and Y dye densities often vary in cases where the source of light, in which the image is recorded on the film, is inappropriate for the film, e.g. in cases where a fluorescent tube is used with respect to a daylight type of color film.

Also, as illustrated in FIGS. 13A and 13B, the differences among the C, M, and Y dye densities formed with gray exposure are equal to predetermined values over the entire range of the image-recording exposure amount. Therefore, for example, it may be considered to correct the R, G, and B image signals by calculating the differences among the C, M, and Y dye densities at a highlight (full white) point and a shadow (full black) point, and adding appropriate bias components to the R, G, and B image signals in accordance with the calculated differences among the C, M, and Y dye densities. However, ordinarily, the gray balance cannot be kept with such a technique. The reasons for the above will be described hereinbelow with reference to FIGS. 14A, 14B, 14C, and 14D.

FIG. 14A shows the relationships between the color density of one of C, M, and Y formed on color film and the wavelength, which relationships are obtained for different levels of exposure amounts. In FIG. 14A, an upper curve is for a larger exposure amount. When the density on the film is detected with two different photodetectors, which respectively have the peaks of reading sensitivity at wavelengths $S_1$ and $S_2$ as illustrated in FIG. 14B, the relationship between the exposure amount and the detected density varies for different photodetectors as illustrated in FIG. 14C. Therefore, even if the differences among the C, M, and Y dye densities are equal to predetermined values over the entire range of the image-recording exposure amount as illustrated in FIG. 13A or 13B, the differences among the R, G, and B image signals, i.e. the differences among the detected densities, will vary for different exposure amounts as illustrated in FIG. 14D. Accordingly, even if the R, G, and B image signals are corrected by calculating the differences among the C, M, and Y dye densities at the shadow point, or the like, and adding appropriate bias components to the R, G, and B image signals in accordance with the calculated differences among the C, M, and Y dye densities, the gray balance cannot be kept over the entire range of the exposure amount.

Further, the exposure amount with respect to a gray object does not always become identical among R, G, and B, depending upon the source of light, in which the image is recorded on the film. Therefore, it often occurs that only one or two of the R, G, and B image signals are subjected to compression of the dynamic range by the toe or the shoulder of the color formation characteristics of the color film. FIG. 15 shows how the dynamic range is compressed by the toe of the color formation characteristics of the color film. As illustrated in FIG. 15, even though the range $\Delta G$ of the G exposure amount and the range $\Delta R$ of the R exposure amount are equal to each other, the levels of the G and R exposure amounts are different from each other, and only C is affected by the toe of the color formation characteristics. Therefore, the C color density range $\Delta C$ and the M color density range $\Delta M$ become different from each other. In such cases, the dynamic ranges of the R and G image signals become different from each other. Accordingly, even if the R, G, and B image signals are corrected by adding appropriate bias components to them as described above, the gray balance cannot be kept over the entire range of the exposure amount.

SUMMARY OF THE INVENTION

The primary object of the present invention is to provide a method for adjusting gray balance in a photo printer, wherein R, G, and B image signals, which have been obtained by reading out an image recorded on color film, are adjusted over their entire ranges in a photo printer, such that their image signal components corresponding to a gray object may represent an identical density.

Another object of the present invention is to provide a method for adjusting gray balance in a photo printer, wherein a color failure is avoided, and the gray balance is adjusted accurately.

The present invention provides a method for adjusting gray balance in a photo printer, wherein each of three color light beams is modulated with one of image signals D1, D2, and D3, where each of 1, 2, and 3 corresponds to one of red, green, and blue, which image signals have been obtained by reading out an image recorded on color film, each of the image signals being made up of a series of image signal components, which represent each-color densities at picture elements of the image, wherein a color photosensitive material is scanned with the modulated light beams, and wherein a color image is thereby reproduced on the color photosensitive material, the image signals D1, D2, and D3 being adjusted such that their image signal components corresponding to a gray object may represent an identical density, the method comprising the steps of:

i) calculating chrominance information at respective picture elements from the image signals D1, D2, and D3, ii) eliminating image signal components representing a high-saturation picture element, which has a saturation higher than a predetermined value, and picture elements, which are adjacent to the high-saturation picture element and have hues such that the differences between their hues and the hue of the high-saturation picture element may be equal to at most a predetermined value, from the image signals D1, D2, and D3, whereby image signal components D1', image signal components D2', and image signal components D3', which represent low-saturation picture elements, are obtained, iii) calculating a shadow point D1$s$ and a highlight point D1$h$ in the image signal components D1', a shadow point D2$s$ and a highlight point D2$h$ in the image signal components D2', and a shadow point D3$s$ and a highlight point D3$h$ in the image signal components D3', iv) correcting at least one of the highlight points D1$h$, D2$h$, and D3$h$ such that the dynamic ranges from the shadow points to the highlight points for the respective colors may become identical with one another in cases where the differences among the dynamic ranges for the respective colors are larger than a predetermined allowable value, v) obtaining a set of image signal components (D1", D2") by:

grouping pairs of the image signal components (D1', D2'), each of which pairs corresponds to a single picture element, and in which pairs the image signal components, each constituting one of counterparts in each pair, have an identical value, calculating the mean value of the values of the image signal components, each of which constitutes the other counterpart in each of the grouped pairs of the image signal components (D1', D2'), and replacing the values of the image signal components, each of which constitutes the other counterpart in each of the grouped pairs of the image signal components (D1', D2'), by the calculated mean value, vi) obtaining a set of image signal components (D3", D2") by:

grouping pairs of the image signal components (D3', D2'), each of which pairs corresponds to a single picture element, and in which pairs the image signal components, each constituting one of counterparts in each pair, have an identical value, calculating the mean value of the values of the image signal components, each of which constitutes the other counterpart in each of the grouped pairs of the image signal components (D3', D2'), and replacing the values of the image signal components, each of which constitutes the other counterpart in each of the grouped pairs of the image signal components (D3', D2'), by the calculated mean value, vii) calculating the relationship between the densities of the two colors, which correspond to the set of the image signal components (D1", D2"), from the set of the image signal components (D1", D2") with respect to the two colors, the shadow points (D1$s$, D2$s$), and the highlight points (D1$h$, D2$h$), viii) carrying out a linear transform of at least either one of the image signals D1 and D2 in accordance with the calculated relationship between the densities of the two colors, which correspond to the set of the image signal components (D1", D2"), such that the one of the image signals D1 and D2 may become identical with the other image signal over its entire range, ix) calculating the relationship between the densities of the two colors, which correspond to the set of the image signal components (D3", D2"), from the set of the image signal components (D3", D2") with respect to the two colors, the shadow points (D3$s$, D2$s$), and the highlight points (D3$h$, D2$h$), and x) carrying out a linear transform of at least either one of the image signals D3 and D2 in accordance with the calculated relationship between the densities of the two colors, which correspond to the set of the image signal components (D3", D2"), such that the one of the image signals D3 and D2 may become identical with the other image signal over its entire range.

The method for adjusting gray balance in a photo printer in accordance with the present invention should preferably be modified such that, before the chrominance information at respective picture elements is calculated from the image signals D1, D2, and D3, γ (gamma) conversion processing, in which the conversion characteristics are fixed for each color, may be carried out on at least one of the image signals D1, D2, and D3, such that the differences among the densities represented by the image signal components of the image signals D1, D2, and D3, which image signal components correspond to the gray object, may become approximately equal to predetermined values regardless of exposure amounts.

Also, the method for adjusting gray balance in a photo printer in accordance with the present invention should preferably be modified such that the picture elements belonging to a specific first hue may be selected from the low-saturation picture elements, the pairs of the image signal components (D1', D2') may be obtained from the image signal components D1', D2', and D3', which represent the selected picture elements belonging to the first hue, the picture elements belonging to a specific second hue, which is different from the first hue, may be selected from the low-saturation picture elements, and the pairs of the image signal components (D3', D2') may be obtained from the image signal components D1', D2', and D3', which represent the selected picture elements belonging to the second hue.

The specific first hue and the specific second hue may be selected in the manner described below. Specifically, in cases where the image signal D1 represents the R (red)

density, the image signal D2 represents the G (green) density, and the image signal D3 represents the B (blue) density, the picture elements belonging to the blue-yellow hues are selected as the picture elements belonging to the first hue (i.e., as the picture elements for obtaining the relationship between the G density and the R density), and the picture elements belonging to the red-cyan hues are selected as the picture elements belonging to the second hue (i.e., as the picture elements for obtaining the relationship between the G density and the B density).

Further, in the method for adjusting gray balance in a photo printer in accordance with the present invention, by way of example, the two linear transforms are carried out in the manner described below. Specifically, the two linear transforms are carried out such that:

(a) in cases where the relationship between the densities of the two colors corresponding to the set of the image signal components (D1", D2"), which relationship has been calculated from the set of the image signal components (D1", D2") with respect to the two colors, the shadow points (D1$s$, D2$s$), and the highlight points (D1$h$, D2$h$), is given by the formula $Y=\alpha_1 \cdot X+\beta_1$ on an X-Y coordinate system, the image signal D2 may not be transformed, and the image signal D1 may be linearly transformed into an image signal D1$c$, which is represented by the formula $D1c=\alpha_1 \cdot D1+\beta_1$, and (b) in cases where the relationship between the densities of the two colors corresponding to the set of the image signal components (D3", D2"), which relationship has been calculated from the set of the image signal components (D3", D2") with respect to the two colors, the shadow points (D3$s$, D2$s$), and the highlight points (D3$h$, D2$h$), is given by the formula $Y=\alpha_3 \cdot X+\beta_3$ on the X-Y coordinate system, the image signal D2 may not be transformed, and the image signal D3 may be linearly transformed into an image signal D3$c$, which is represented by the formula $D3c=\alpha_3 D3+\beta_3$.

With the method for adjusting gray balance in a photo printer in accordance with the present invention, basically, the linear transforms are carried out on at least either one of the image signals D1 and D2 and on at least either one of the image signals D3 and D2, such that the shadow points D1$s$, D2$s$, and D3$s$ of the image signals D1, D2, and D3 may become identical with one another, and such that the highlight points D1$h$, D2$h$, and D3$h$ of the image signals D1, D2, and D3 may become identical with one another. Also, in the linear transforms, the image signal components D1', D2', and D3' representing the low-saturation picture elements, which components have been obtained from the image signals D1, D2, and D3, are utilized. Therefore, the gray balance can be adjusted also for images having no highlight scene, such as images of still life recorded at a close distance.

Also, with the method for adjusting gray balance in a photo printer in accordance with the present invention, the gray balance is adjusted by linearly transforming the image signals. Therefore, the gray balance can be kept even in cases where, as described above with reference to FIGS. 14A through 14D and FIG. 15, the gray balance cannot be kept over the entire range of the exposure amount by merely adding appropriate bias components to the R, G, and B image signals.

Further, with the method for adjusting gray balance in a photo printer in accordance with the present invention, instead of the image signal components D1', D2', and D3' representing the low-saturation picture elements being used directly, the set of the image signal components (D1", D2") and the set of the image signal components (D3", D2") are utilized. The set of the image signal components (D1", D2") is obtained by grouping the pairs of the image signal components (D1', D2'), in which pairs the image signal components, each constituting one of counterparts in each pair, have an identical value, calculating the mean value of the values of the image signal components, each of which constitutes the other counterpart in each of the grouped pairs of the image signal components (D1', D2'), and replacing the values of the image signal components, each of which constitutes the other counterpart in each of the grouped pairs of the image signal components (D1', D2'), by the calculated mean value. The set of the image signal components (D3", D2") is obtained by grouping the pairs of the image signal components (D3', D2'), in which pairs the image signal components, each constituting one of counterparts in each pair, have an identical value, calculating the mean value of the values of the image signal components, each of which constitutes the other counterpart in each of the grouped pairs of the image signal components (D3', D2'), and replacing the values of the image signal components, each of which constitutes the other counterpart in each of the grouped pairs of the image signal components (D3', D2'), by the calculated mean value. Therefore, even if the distributions of the image signal components D1', D2', and D3' contain biased portions, adverse effects of the biased portions in the distributions can be eliminated, and the gray balance can be adjusted accurately.

Furthermore, with the method for adjusting gray balance in a photo printer in accordance with the present invention, in the step for obtaining the image signal components D1', D2', and D3' representing the low-saturation picture elements, the image signal components representing a high-saturation picture element and the picture elements, which are adjacent to the high-saturation picture element and have hues such that the differences between their hues and the hue of the high-saturation picture element may be equal to at most a predetermined value, are eliminated from the image signals D1, D2, and D3. (Specifically, the picture elements, which are considered as being the high-saturation picture elements by taking both the chrominance information and the information about the positions of the picture elements into consideration, are found, and the image signal components representing the thus found picture elements are eliminated from the image signals D1, D2, and D3.) Therefore, only the image signal components D1', D2', and D3' representing the low-saturation picture elements, which components are useful for the adjustment of the gray balance, can be extracted accurately. These effects also contribute to the accurate adjustment of the gray balance.

Moreover, with the method for adjusting gray balance in a photo printer in accordance with the present invention, in cases where the differences among the dynamic ranges from the shadow points to the highlight points for the respective colors are larger than a predetermined allowable value, at least one of the highlight points D1$h$, D2$h$, and D3$h$ is corrected such that the dynamic ranges for the respective colors may become identical with one another. Therefore, the problems can be prevented from occurring in that, in cases where a highlight point is detected by mistake from an image having no highlight point, such as an image of still life recorded at a close distance, the operation for adjusting the gray balance is carried out by using the highlight point having been detected by mistake, and a failure is thereby caused to occur with the adjustment of the gray balance.

With the method for adjusting gray balance in a photo printer in accordance with the present invention, before the chrominance information at respective picture elements is calculated from the image signals D1, D2, and D3, the γ (gamma) conversion processing may be carried out on at least one of the image signals D1, D2, and D3, such that the differences among the densities represented by the image signal components of the image signals D1, D2, and D3, which image signal components correspond to the gray object, may become approximately equal to predetermined values regardless of exposure amounts. In such cases, the load of the operations in the subsequent processing can be kept small.

With the method for adjusting gray balance in a photo printer in accordance with the present invention, wherein the picture elements belonging to the specific first hue and the specific second hue are selected, the so-called "color failure" (i.e., the subject failure due to the color of the object) can be prevented from occurring, and the gray balance can be adjusted accurately.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 4 is a graph showing a probability density function of an image signal, which is formed in the embodiment of the method for adjusting gray balance in accordance with the present invention, FIG. 5 is an explanatory view showing a color difference space, which is used in the embodiment of the method for adjusting gray balance in accordance with the present invention, FIG. 11 is an explanatory view showing how the relationship between densities of two colors is calculated in the embodiment of the method for adjusting gray balance in accordance with the present invention, FIG. 12 is an explanatory view showing an example in which the relationship between densities of two colors is calculate inappropriately.

DESCRIPTION OF THE PREFERRED EMBODIMENTS

The present invention will hereinbelow be described in further detail with reference to the accompanying drawings.

Figure 1:
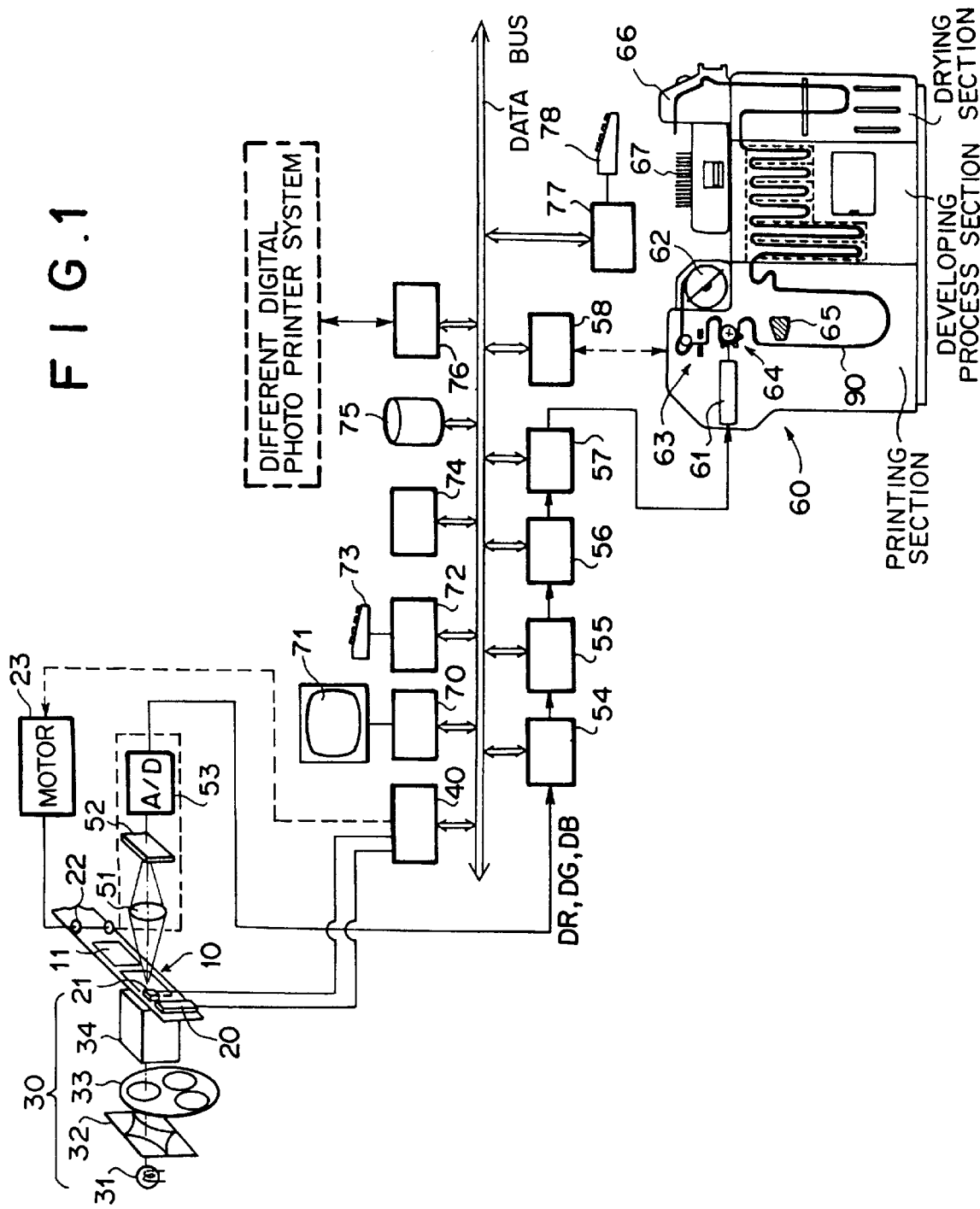
FIG. 1 is a schematic view showing an example of a digital photo printer, in which an embodiment of the method for adjusting gray balance in accordance with the present invention is employed.
Figure 2:
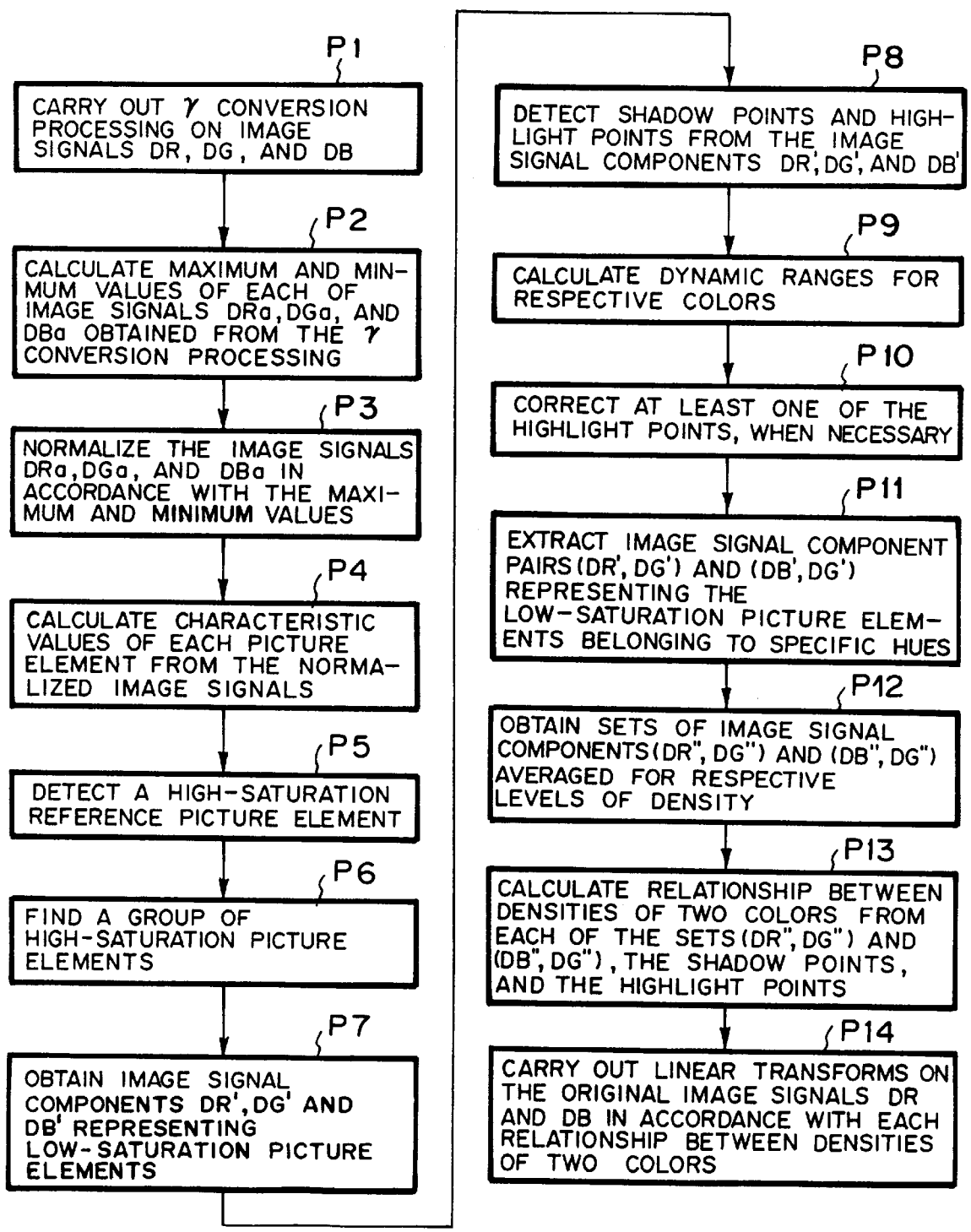
FIG. 2 is a flow chart showing how the processing in the embodiment of the method for adjusting gray balance in accordance with the present invention is carried out in the digital photo printer of FIG. 1, FIGS. 3A and 3B are graphs serving as an aid in explaining how the γ conversion processing is carried out in the embodiment of the method for adjusting gray balance in accordance with the present invention.

FIG. 1 is a schematic view showing an example of a digital photo printer, in which an embodiment of the method for adjusting gray balance in accordance with the present invention is employed. FIG. 2 is a flow chart showing how the processing for the adjustment of gray balance is carried out in the digital photo printer of FIG. 1.

The digital photo printer shown in FIG. 1 comprises a scanner 20 for reading a film number having been recorded on a check tape adhered to an end of color photographic film 10, and a bar code reader 21 for reading a bar code, which represents a frame number and has been formed for each of image-recording frames 11, 11, . . . of the photographic film 10. The digital photo printer also comprises a sprocket 22, which rotates in engagement with perforations of the film 10 and conveys the film 10, and a motor 23 for driving the sprocket 22. The digital photo printer further comprises a film scanner control interface (I/F) 40 for feeding the information, which represents the film number having been read by the scanner 20, and the information, which represents the frame number having been read by the bar code reader 21, to a data bus and feeding a motor drive control signal to the motor 23.

The digital photo printer still further comprises a light source unit 30, which is provided with a light source 31 for producing white light, a light regulating unit 32, a color separation unit 33, and a diffusing box 34, and which irradiates the reading light to each image-recording frame 11 of the film 10. The digital photo printer also comprises a CCD 52 for photoelectrically reading out an image (a transmission image) from the image-recording frame 11, to which the reading light is irradiated by the light source unit 30, via a lens 51. The digital photo printer further comprises an analog-to-digital converter 53 for converting image signals, which have been received from the CCD 52, into digital image signals. The digital photo printer still further comprises a first image processing unit 54 for carrying out image processing on the digital image signals, which have been received from the analog-to-digital converter 53, and feeding the processed digital image signals into a frame memory 55. The digital photo printer also comprises a second image processing unit 56 for carrying out image processing on the processed digital image signals, which are received from the frame memory 55, with altered image processing parameters when necessary. The digital photo printer further comprises a modulator driver 57 for feeding out modulation signals in accordance with the digital image signals, which have been obtained from the image processing.

The digital photo printer still further comprises a printer 60 for reproducing a visible image from the modulation signals received from the modulator driver 57, and a printer control I/F 58. The digital photo printer also comprises a hard disk drive unit 75 for receiving the digital image signals from the frame memory 55 via a data bus and storing them on a hard disk, a CRT monitor 71 for reproducing a visible image from the digital image signals, when necessary, and displaying image processing conditions, or the like, and a display I/F 70. The digital photo printer further comprises a keyboard 73 from which the image processing conditions, corrected values for the image processing conditions, image retrieval information, and the like, are specified, a keyboard I/F 72, and a central processing unit (CPU) 74. The digital photo printer still further comprises a communication port 76 for communicating with a different digital photo printer system via a communication line, a keyboard 78 which is located at an inspection site for inspecting a photographic print having been reproduced by the printer 60 and from which a make-over command is given, when necessary, and a keyboard I/F 77. The CPU 74 causes the hard disk drive unit 75 to store the image retrieval information, which represents the film number having been read by the scanner 20 and the frame number having been read by the bar code reader 21, the corresponding information, which represents the image processing conditions and has been received from the first image processing unit 54, and the corresponding digital image signals received from the frame memory 55. Also, the CPU 74 controls the operation for retrieving the digital image signals, which represent the image corresponding to the image retrieval information specified from the keyboard 73, from the hard disk of the hard disk drive unit 75. Further, the CPU 74 controls the respective devices connected to the data bus.

The printer 60 is composed of a printing section, a developing process section, and a drying section. The printing section comprises a magazine 62 for storing a roll of long photographic paper 90, and an exposure scanner 61 for modulating light beams with the modulation signals received from the modulator driver 57 and scanning the photographic paper 90 with the modulated light beams in a main scanning direction, which is normal to the longitudinal direction of the photographic paper 90. The printing section also comprises a hole punch unit 63 for making positioning reference holes through the photographic paper 90, and a sub-scanning drive system 64 for conveying the photographic paper 90 in the sub-scanning direction (i.e., the longitudinal direction of the photographic paper 90) by utilizing the reference holes as reference. The printing section further comprises a back print unit 65 for printing the image retrieval information, which has been received through the printer control I/F 58, on the back surface of the photographic paper 90.

The drying section is provided with an ordinary dryer, and a cutter 66 for cutting the exposed and dried portions (photographic prints) one after another from the photographic paper 90. The drying section is also provided with a sorter 67 for arraying the cut photographic prints.

How the digital photo printer operates will be described hereinbelow. Firstly, the CPU 74 drives the motor 23 via the film scanner control I/F. As a result, the sprocket 22 coupled with the motor 23 rotates and conveys the film 10. While the film 10 is being conveyed, the scanner 20 reads the film number recorded on the check tape and feeds the information representing the film number into the CPU 74. Also, the bar code reader 21 reads the bar code, which represents the frame number and has been formed for each of the image-recording frames 11, 11, . . . of the photographic film 10. The bar code reader 21 feeds the information representing the frame number into the CPU 74 via the film scanner control I/F 40.

The light is then irradiated from the light source unit 30 to the image-recording frame 11, from which the bar code has been read, and the image having been recorded in the frame 11 is formed on the CCD 52 by the lens 51. The CCD 52 reads out the image and generates a signal representing the image. The signal generated by the CCD 52 is converted by the analog-to-digital converter 53 into a digital signal, which is made up of a series of image signal components representing picture elements of the image.

The red (R), green (G), and blue (B) color filters of the color separation unit 33 are inserted one after another into the optical path of the light having been produced by the light source 31, and the image having been recorded in the frame 11 is thereby read out by the CCD 52. In this manner, digital image signals D1, D2, and D3, each of which is made up of the image signal components representing color densities at the respective picture elements of the image, are obtained from the analog-to-digital converter 53. In this embodiment, the digital image signals D1, D2, and D3 respectively represent the red, green, and blue densities and will hereinbelow be referred to as the digital image signals DR, DG, and DB.

The digital image signals DR, DG, and DB are fed into the first image processing unit 54. In cases where the digital image signals DR, DG, and DB represent a negative image, the first image processing unit 54 carries out a reversal process on the digital image signals DR, DG, and DB. Also, the first image processing unit 54 carries out image processing on the digital image signals DR, DG, and DB and in accordance with predetermined image processing algorithms, such that a visible image having appropriate image density, gradation, colors, and sharpness may be obtained when it is reproduced as a photographic print from the processed image signals. The processed image signals are fed from the first image processing unit 54 into the frame memory 55.

In a strict sense, instead of the reversal process and the image processing being carried out directly on the digital image signals DR, DG, and DB, the reversal process and the image processing are carried out on the image signals obtained by carrying out gray balance adjustment processing, which will be described later, on the digital image signals DR, DG, and DB.

The image signals are stored in the frame memory 55. Also, the image signals are fed into the CPU 74 through the data bus. Therefore, it becomes possible for the CPU 74 to adjust the dynamic range, or the like, of the CCD 52 and the amount of the light, which is irradiated from the light source unit 30 to the frame 11, in accordance with the image signals received through the data bus.

The image signals, which have been stored in the frame memory 55, are fed into the CRT monitor 71 through the data bus. The CRT monitor 71 reproduces a visible image from the image signals and displays it. The operator (or the person who received a printing order) views the visible image displayed on the CRT monitor 71 and inputs information, which represents corrected values for the image processing, from the keyboard 73, when necessary, such that a visible reproduced image having more appropriate image density, gradation, colors, and sharpness may be obtained.

The information, which represents the corrected values for the image processing and has been inputted from the keyboard 73, is fed into the second image processing unit 56. The second image processing unit 56 also receives the image signals from the frame memory 55 and carries out the image processing on the received image signals and in accordance with the corrected values. The image signals, which have been obtained from the image processing carried out by the second image processing unit 56, are fed into the modulator driver 57. In cases where the conditions, under which the image processing is carried out, need not be corrected, the second image processing unit 56 directly feeds the image signals, which have been received from the frame memory 55, into the modulator driver 57.

The printer 60 is controlled by the CPU 74 via the printer control I/F 58. Specifically, at the printing section, the sub-scanning drive system 64 conveys the photographic paper 90, which extends from the magazine 62 along a predetermined conveyance path, in the sub-scanning direction. The hole punch unit 63, which is located on the conveyance path, makes reference holes, which serve as reference for synchronization, at positions in the vicinity of a side edge of the photographic paper 90. By way of example, the reference holes are made at length intervals corresponding to a feed distance of a single photographic print. In the printer 60, the photographic paper 90 is conveyed by the utilization of the reference holes as the reference for synchronization.

The photographic paper 90 is scanned with the light beams, which are produced by the exposure scanner 61 and have been modulated with the image signals, in the main scanning direction. The photographic paper 90 is also scanned with the modulated light beams in the sub-scanning direction by being conveyed in the manner described above. In this manner, the image represented by the image signals is reproduced on the photographic paper 90. The speed, with which the photographic paper 90 is conveyed, is controlled by the CPU 74, and the main scanning and the sub-scanning are synchronized with each other.

Thereafter, the photographic paper 90 is conveyed along the conveyance path from the printing section into the developing process section. At the developing process section, a predetermined developing process and a washing process are carried out on the photographic paper 90. The photographic paper 90 is then conveyed into the drying section. At the drying section, the photographic paper 90 having been washed at the developing process section is dried. The dried photographic paper 90 is cut by the cutter 66 into pieces, each of which corresponds to the size of a single photographic print, by utilizing the reference holes as the reference for synchronization.

As described above, the first image processing unit 54 carries out the image processing on the digital image signals DR, DG, and DB. Before carrying out the image processing, the first image processing unit 54 carries out the gray balance adjustment processing on the digital image signals DR, DG, and DB such that their image signal components corresponding to a gray object may represent an identical image density. How the gray balance adjustment processing is carried out will be described hereinbelow with reference to FIG. 2.

Figure 3A:
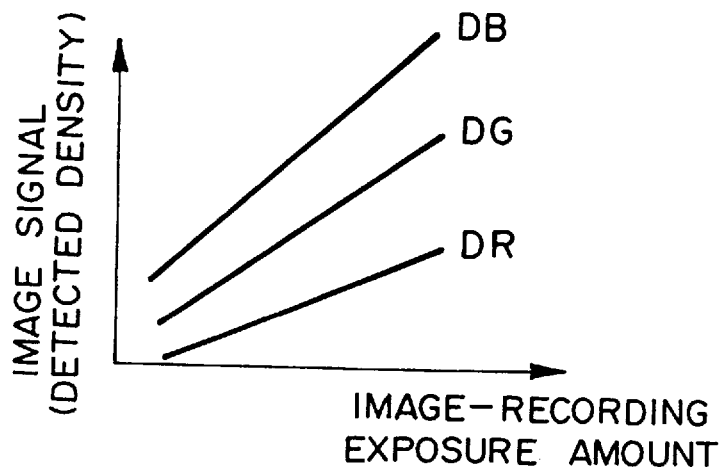
Figure 3B:
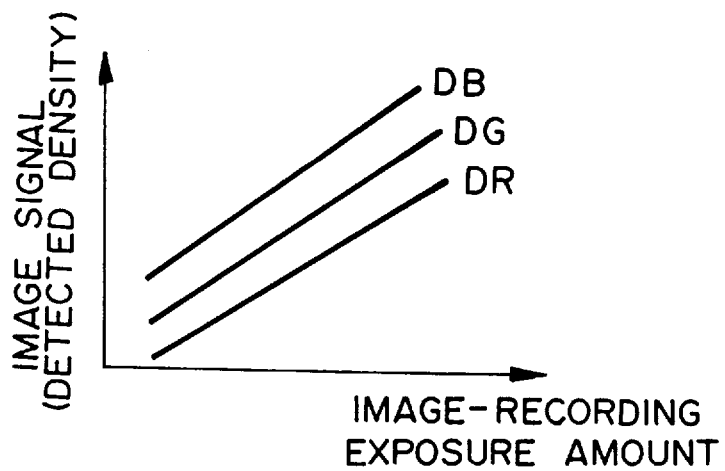

With reference to FIG. 2, in a step P1, each of the digital image signals DR, DG, and DB is subjected to $\gamma$ (gamma) conversion processing, in which an inherent look-up table is used. Specifically, as illustrated in FIG. 3A, the differences among the densities represented by the image signal components of the digital image signals DR, DG, and DB, which image signal components correspond to the gray object, vary for different exposure amounts. With the $\gamma$ conversion processing, each of the digital image signals DR, DG, and DB is converted in accordance with inherent conversion characteristics such that, as illustrated in FIG. 3B, the differences among the densities represented by the image signal components of the digital image signals DR, DG, and DB, which image signal components correspond to the gray object, may become equal to predetermined values regardless of the exposure amounts. As the look-up tables, predetermined tables are utilized regardless of the kind of the film.

The $\gamma$ conversion processing need not necessarily be carried out. However, in cases where the $\gamma$ conversion processing is carried out, the load of the operations carried out in the subsequent processing can be kept small.

From the $\gamma$ conversion processing, image signals DRa, DGa, and DBa are obtained. The image signals DRa, DGa, and DBa also contain the image signal components representing high-saturation picture elements. For the adjustment of the gray balance, it is necessary to use the image signal components representing the picture elements other than the high-saturation picture elements. Therefore, in order for the high-saturation picture elements to be specified, characteristic values (lightness, hue, and saturation) of each picture element are calculated. For such purposes, firstly, the image signals DRa, DGa, and DBa are normalized.

In the operations for the normalization, in a step P2, probability density functions of the image signals DRa, DGa, and DBa are formed, and the maximum value and the minimum value of the image signal in each probability density function are calculated. FIG. 4 shows an example of the probability density function.

Thereafter, in a step P3, each of the image signals DRa, DGa, and DBa is normalized in accordance with the corresponding maximum and minimum values. By way of example, the normalization is carried out with the formula shown below.

Normalized image signal =

$$100 \times (\text{image signal} - \text{minimum value}) \div$$

$$(\text{maximum value} - \text{minimum value})$$

In this manner, the image signals DRa, DGa, and DBa are respectively normalized, and normalized image signals DRb, DGb, and DBb are obtained from the normalization. In a step P4, the characteristic values (lightness, hue, and saturation) of each of all picture elements represented by the image signal components of the normalized image signals DRb, DGb, and DBb are calculated.

By way of example, the lightness of each picture element is calculated with the formula shown below.

$$\text{Lightness} = (DRb + DGb + DBb) \div 3$$

Figure 6:
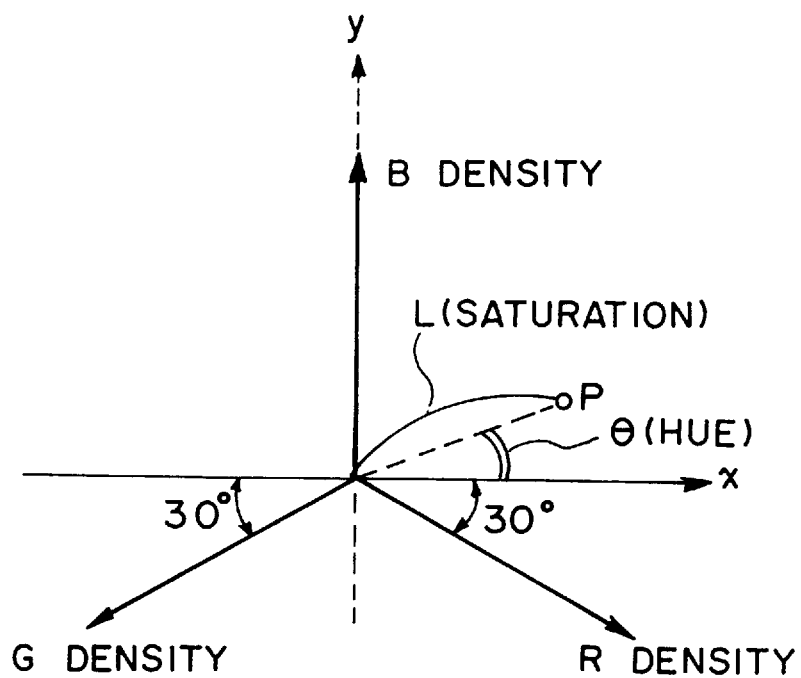
FIG. 6 is an explanatory view showing chrominance information in the color difference space.

The chrominance information concerning the hue and the saturation is defined in the manner described below. Specifically, as illustrated in FIG. 5, an RGB density space is considered. In the RGB density space, all of density points having coordinates (DRb, DGb, DBb) are mapped on a color difference plane ψ. The color difference plane ψ is the plane, which is represented by the formula R+G+B=0, i.e. which is normal to a straight line Q and contains an origin (0, 0, 0). Also, as illustrated in FIG. 6, an x-y coordinate system is set on the thus defined color difference plane ψ. In cases where the mapped point of the density point, which is represented by the normalized image signal component representing a certain picture element, is P, the hue of the picture element is defined by an angle θ, which is made between the x axis and the straight line, that passes through the origin and the point P. Also, the saturation of the picture element is defined by a distance L between the origin and the point P.

Actually, a table should preferably be prepared previously, which defines the combinations of the normalized image signals DRb, DGb, and DBb, and the corresponding values of the angle θ and the distance L. In such cases, the values of the angle θ and the distance L can be found from the values of the normalized image signals DRb, DGb, and DBb by making reference to the table.

In the manner described above, the characteristic values (lightness, hue, and saturation) of each of all picture elements represented by the image signal components of the normalized image signals DRb, DGb, and DBb are calculated. Thereafter, a high-saturation picture element having a saturation higher than a predetermined value is specified in accordance with the calculated characteristic values. For such purposes, in a step P5, firstly, the picture elements constituting the image are selected one after another by following the same path as that in faster scanning of the image, and the saturation with respect to the selected picture element and a predetermined threshold value are compared with each other. A picture element, at which the saturation is not lower than the threshold value, is taken as a high-saturation reference picture element. The information representing the lightness, the hue, and the position of the reference picture element is stored in a storage unit.

Figure 7:
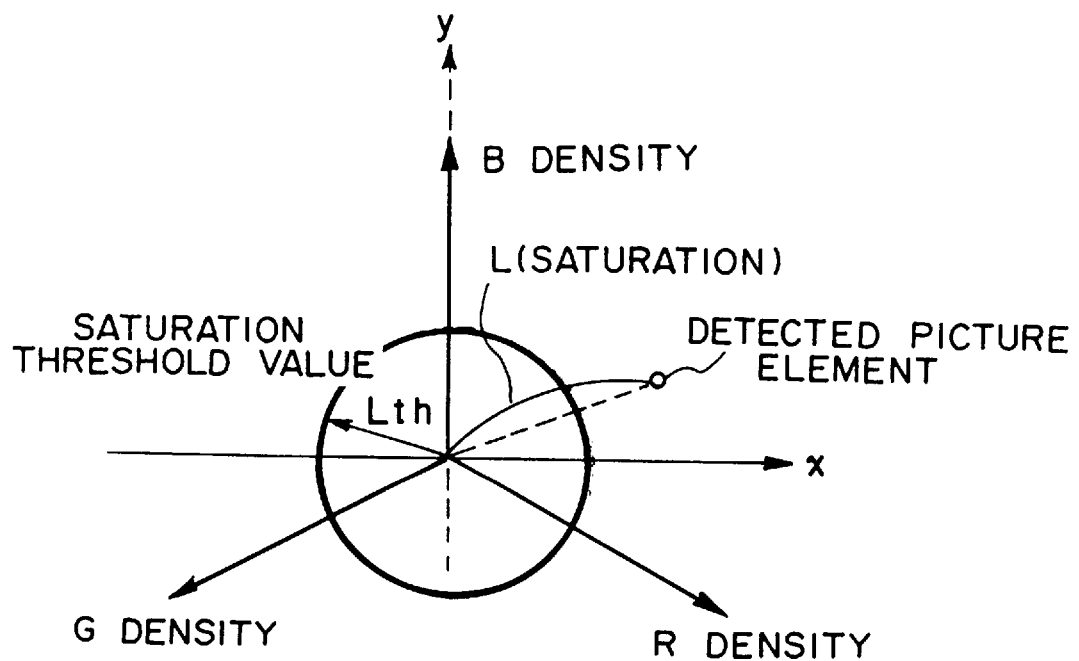
FIG. 7 is an explanatory view showing how a high-saturation picture element is specified in the embodiment of the method for adjusting gray balance in accordance with the present invention.

Specifically, in the process for detecting the reference picture element, as illustrated in FIG. 7, in the x-y coordinate system having been set on the same color difference plane as that shown in FIG. 6, a circle having its center at the origin and having a radius equal to the saturation threshold value Lth is drawn, and a picture element located on the circle or on the side outward from the circle is detected.

Thereafter, in a step P6, high-saturation picture elements are grouped by considering the positions of the respective picture elements in the image. Specifically, the chrominance information, i.e. the hues and the saturations, of eight picture elements adjacent to the aforesaid reference picture element (i.e., the picture elements located on the upper, lower, right, and left sides and four oblique sides of the reference picture element) is investigated. An adjacent picture element, which has a hue and a saturation such that the differences between its hue and saturation and the hue and saturation of the reference picture element may not be larger than predetermined values, is classified as belonging to the same group of the high-saturation picture elements as the reference picture element. The information representing the position of the adjacent picture element, which has thus been classified as belonging to the group of the high-saturation picture elements, is stored in the storage unit. Alternatively, the hues, the saturations, and the levels of lightness of the adjacent picture elements may be compared with those of the reference picture element. Also, in cases where all of the differences in the hue, the saturation, and the lightness between an adjacent picture element and the reference picture element are not larger than predetermined values, the adjacent picture element may be classified as belonging to the group of the high-saturation picture elements.

In the manner described above, the new picture element is classified as belonging to the group of the high-saturation picture elements. Thereafter, the hues and the saturations (as well as the levels of lightness, when necessary) of eight picture elements adjacent to the new classified high-saturation picture element are investigated. An adjacent picture element, which has a hue and a saturation such that the differences between its hue and saturation and the hue and saturation of the new classified high-saturation picture element may not be larger than the predetermined values, is classified as belonging to the group of the high-saturation picture elements. The information representing the position of the adjacent picture element, which has thus been classified as belonging to the group of the high-saturation picture elements, is stored in the storage unit.

The process described above is iterated. When an adjacent picture element, which has a hue and a saturation such that the differences between its hue and saturation and the hue and saturation of the picture element belonging to the group of the high-saturation picture elements may not be larger than the predetermined values, is not found any more, the process for comparison with adjacent picture elements is ceased.

Figure 8:
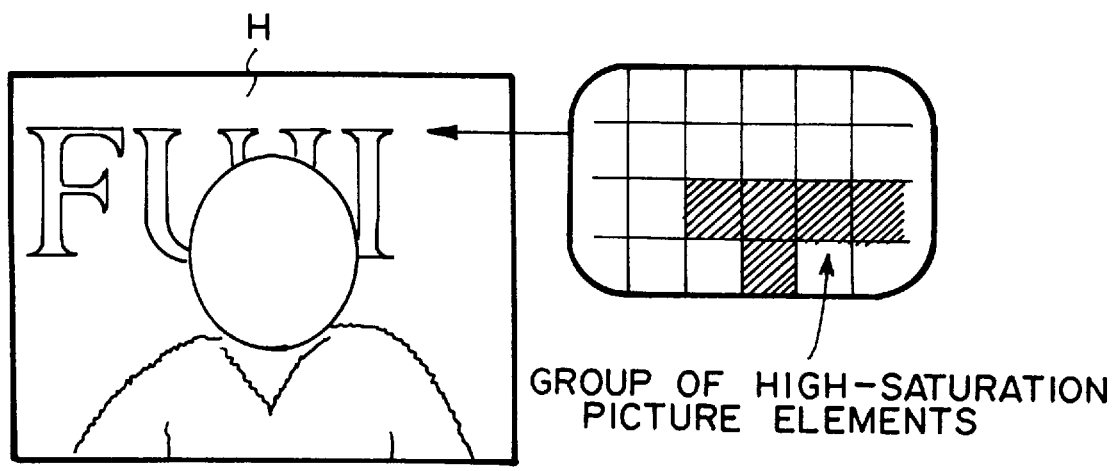
FIG. 8 is an explanatory view showing how high-saturation picture elements are grouped in the embodiment of the method for adjusting gray balance in accordance with the present invention.

As illustrated in FIG. 8, from the process described above, a group of the high-saturation picture elements adjacent to one another in a photographic image H is detected. Thereafter, at an image portion spaced apart from the group of the high-saturation picture elements, the process for detecting a reference picture element and the subsequent process described above are carried out again, and a different group of the high-saturation picture elements is detected.

The processes described above are carried out over the entire area of the photographic image. As a result, ordinarily, several groups of the high-saturation picture elements are detected. As described above, the information representing the positions of the respective high-saturation picture elements belonging to each group is stored in the storage unit. Therefore, in a step P7, the image signal components representing the picture elements, the positions of which are stored in the storage unit, are eliminated from the normalized image signals DRb, DGb, and DBb. In this manner, image signal components DR', image signal components DG', and image signal components DB', which represent low-saturation picture elements, are obtained.

With conventional techniques, wherein the image signal components representing the low-saturation picture elements are to be obtained, the comparison with the saturation threshold value Lth is merely carried out for each picture element, and the position of each picture element is not considered. However, for example, as for an image in which the patterns of bright red clothes occupy the most part of the image area, the red image signal is ordinarily distributed continuously from a low saturation to a high saturation. In such cases, if the image signal components representing the low-saturation picture elements are obtained by merely carrying out the comparison with the saturation threshold value Lth, all of the picture elements corresponding to the patterns of the red clothes cannot be eliminated, and therefore a bias will remain in the image signal components representing the low-saturation picture elements.

However, with the embodiment of the method for adjusting gray balance in a photo printer in accordance with the present invention, in the step for obtaining the image signal components DR', DG', and DB' representing the low-saturation picture elements, the image signal components representing the high-saturation picture element and the picture elements, which are adjacent to the high-saturation picture element and have hues such that the differences between their hues and the hue of the high-saturation picture element may be equal to at most the predetermined value, are eliminated from the normalized image signals DRb, DGb, and DBb. (Specifically, the picture elements, which are considered as being the high-saturation picture elements by taking both the chrominance information and the information about the positions of the picture elements into consideration, are found, and the image signal components representing the thus found picture elements are eliminated from the normalized image signals DRb, DGb, and DBb.) Therefore, even if a slight deviation occurs in the normalization of the image signals, only the image signal components DR', DG', and DB' representing the low-saturation picture elements, which components are useful for the adjustment of the gray balance, can be extracted accurately. Accordingly, the gray balance can be adjusted accurately.

Thereafter, in a step P8, the probability density functions of the image signal components DR', the image signal components DG', and the image signal components DB', which represent the low-saturation picture elements, are formed. Also, the minimum value and the maximum value of the signal values (density) in each of the probability density functions are respectively detected as a shadow point and a highlight point. In this embodiment, wherein the negative film is processed, the minimum value of density corresponds to the shadow point, and the maximum value of density corresponds to the highlight point. The shadow point and the highlight point of the image signal components DR' are herein represented respectively by DRs and DRh. Also, the shadow point and the highlight point of the image signal components DG' are represented respectively by DGs and DGh, and the shadow point and the highlight point of the image signal components DB' are represented respectively by DBs and DBh.

Thereafter, in a step P9, the dynamic ranges IR=(DRh−DRs), IG=(DGh−DGs), and IB=(DBh−DBs) of the respective colors are calculated. Also, the differences among the dynamic ranges, i.e. (IR−IG), (IG−IB), and (IB−IR), are calculated. In a step P10, in cases where the absolute values of the differences (IR−IG), (IG−IB), and (IB−IR) are larger than a predetermined allowable value, at least one of the highlight points DRh, DGh, and DBh is corrected such that the dynamic ranges IR, IG, and IB may become identical with one another.

The correction of the highlight point is carried out for the reasons described below. Specifically, in general, there are only a few photographic images having no shadow point, and there are many photographic images having no highlight point. Therefore, ordinarily, it is considered that a dynamic range taking an inappropriate value is due to an erroneous detection of the highlight point.

Figure 9:
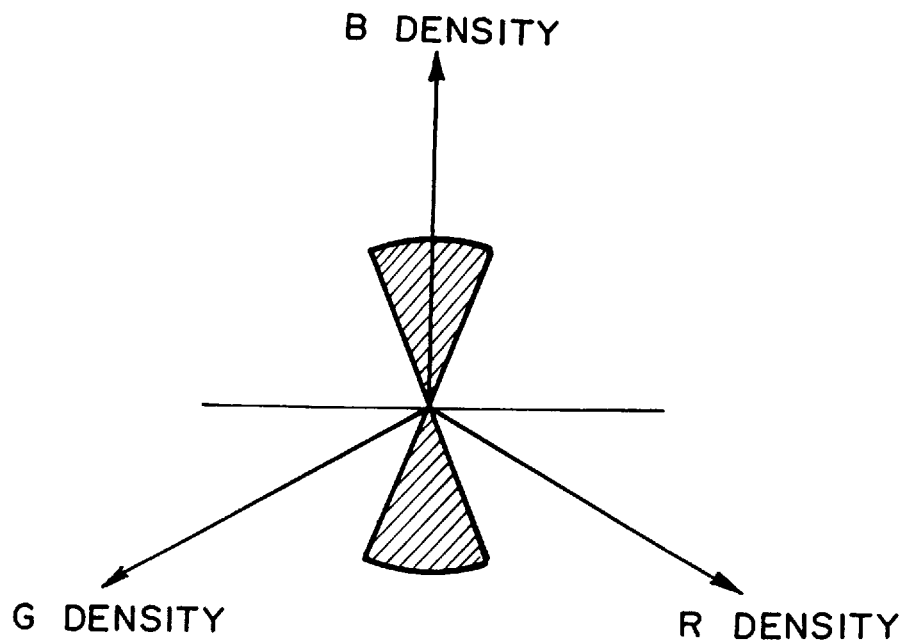
FIG. 9 is an explanatory view showing an example of how picture elements belonging to a specific hue are selected in the embodiment of the method for adjusting gray balance in accordance with the present invention.
Figure 10:
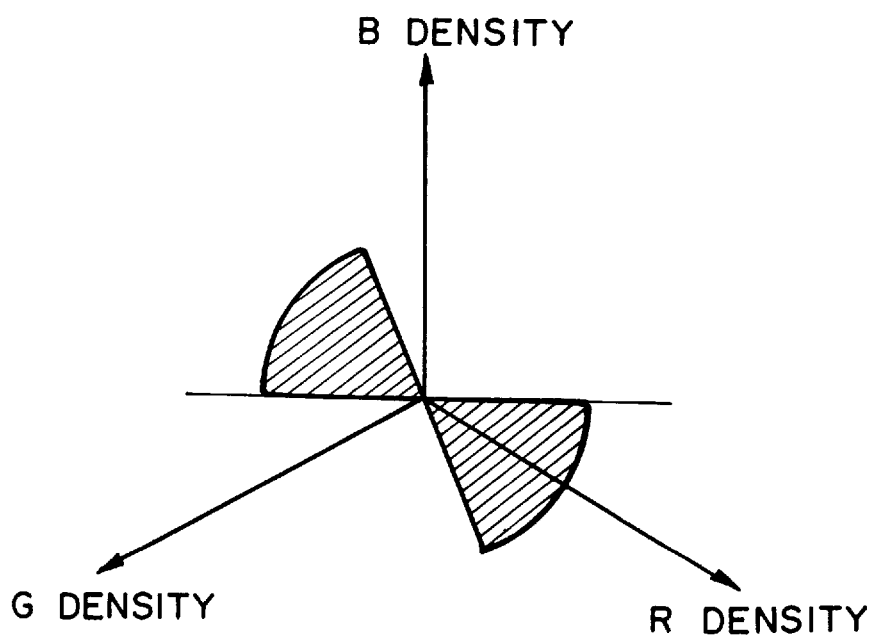
FIG. 10 is an explanatory view showing a different example of how picture elements belonging to a specific hue are selected in the embodiment of the method for adjusting gray balance in accordance with the present invention.
Figure 13A:
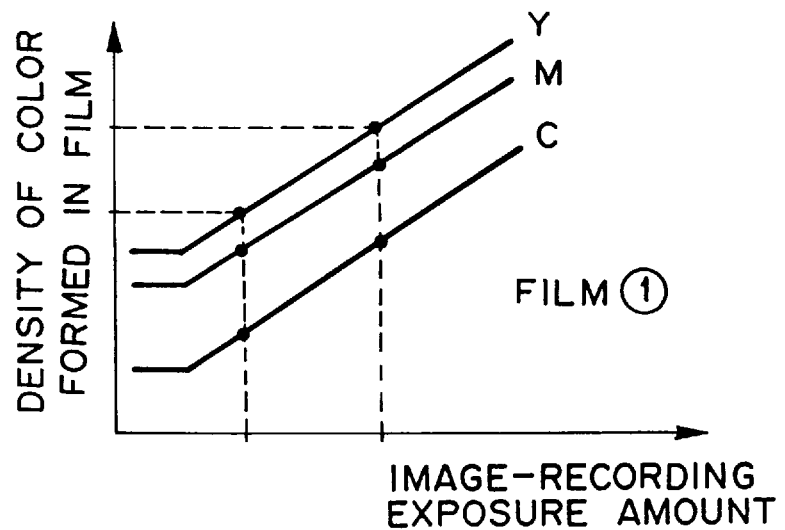
FIGS. 13A and 13B are graphs showing the relationships between image-recording exposure amounts and densities of color formed in different kinds of photographic film.
Figure 13B:
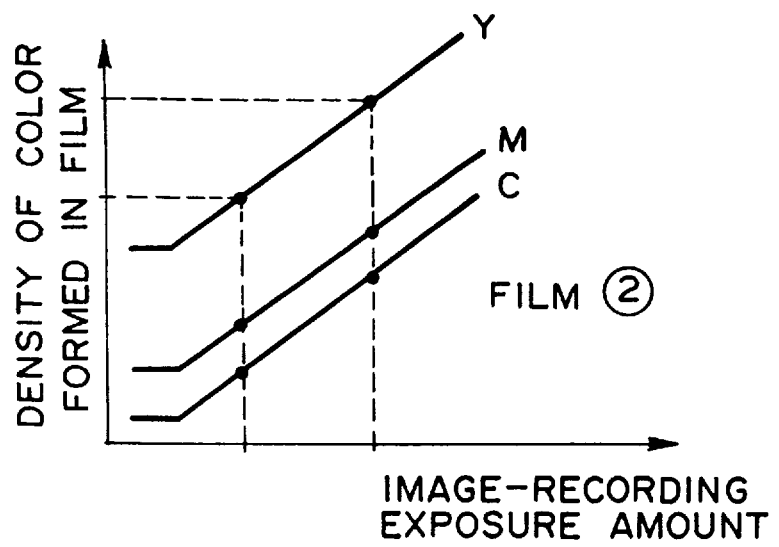
Figures 14C, 14D:
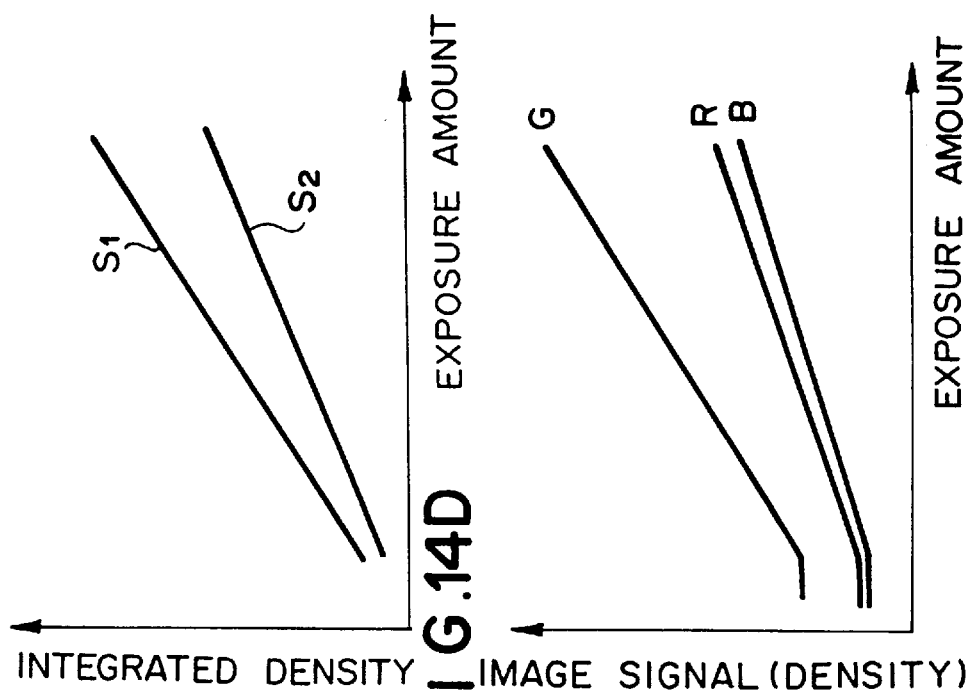
FIGS. 14A, 14B, 14C, and 14D are graphs serving as an aid in explaining the reasons why the adjustment of gray balance is necessary.
Figures 14A, 14B:
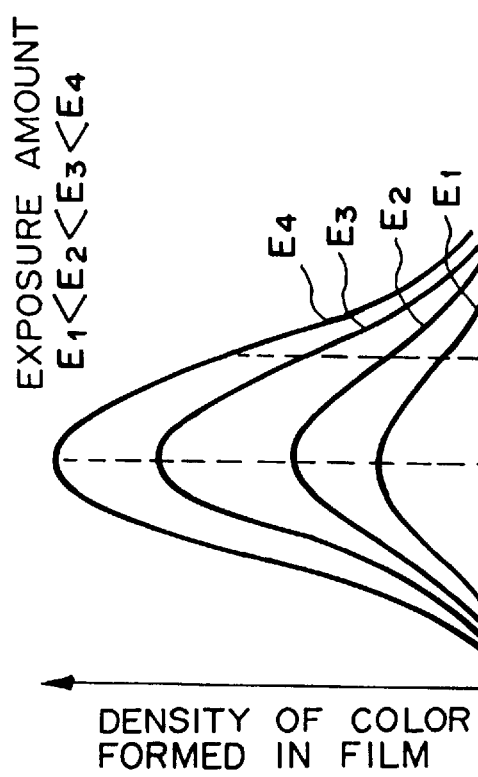
Figure 15:
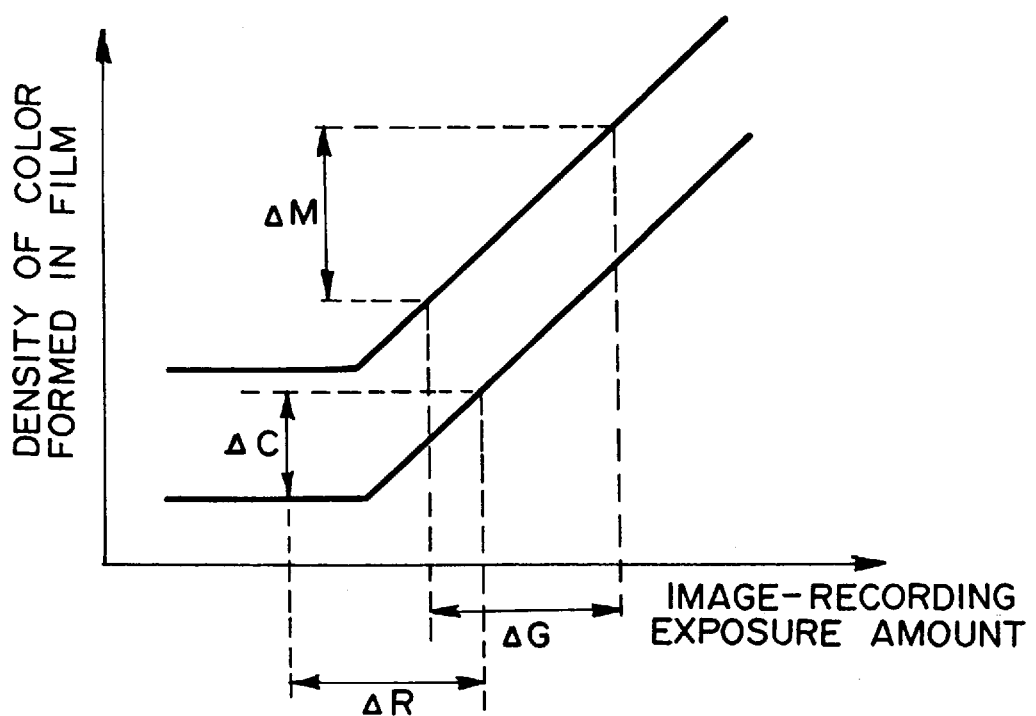
FIG. 15 is a graph serving as an aid in explaining the reasons why the adjustment of gray balance is necessary.

Thereafter, in a step P11, the picture elements belonging to the specific B-Y hues (represented by the regions hatched in FIG. 9) are selected from the low-saturation picture elements. Pairs of the image signal components (DR', DG'), each pair representing the R density and the G density of a single picture element, are then extracted from the image signal components DR', DG', and DB', which represent the selected picture elements belonging to the B-Y hues. Also, the picture elements belonging to the specific R-C hues (represented by the regions hatched in FIG. 10) are selected from the low-saturation picture elements. Pairs of the image signal components (DB', DG'), each pair representing the B density and the G density of a single picture element, are then extracted from the image signal components DR', DG', and DB', which represent the selected picture elements belonging to the R-C hues.

The pairs of the image signal components (DR', DG') are obtained in a number equal to the number of the picture elements belonging to the B-Y hues. Thereafter, in a step P12, the pairs of the image signal components (DR', DG'), in which the image signal components DG' have an identical value, are grouped. The mean value of the values of the image signal components DR' in the thus grouped pairs of the image signal components (DR', DG') is then calculated, and the values of the image signal components DR' is replaced by the calculated mean value. In this manner, a set of image signal components (DR", DG") is obtained from the replacement. Also, the pairs of the image signal components (DB', DG') are obtained in a number equal to the number of the picture elements belonging to the R-C hues. The pairs of the image signal components (DB', DG'), in which the image signal components DG' have an identical value, are grouped. The mean value of the values of the image signal components DB' in the thus grouped pairs of the image signal components (DB', DG') is then calculated, and the values of the image signal components DB' is replaced by the calculated mean value. In this manner, a set of image signal components (DB", DG") is obtained from the replacement.

Thereafter, in a step P13, the set of the image signal components (DR", DG") with respect to the R and G two colors, the shadow point DRs and the highlight point DRh, which have been calculated with respect to the image signal components DR', and the shadow point DGs and the highlight point DGh, which have been calculated with respect to the image signal components DG', are plotted on the X-Y coordinate system illustrated in FIG. 11. The relationship between the densities of the R and G two colors is thereby calculated. In FIG. 11, the white dots represent the set of the image signal components (DR", DG").

The relationship between the densities of the R and G two colors may be calculated with one of known techniques. For example, it may be calculated by obtaining a regression line J with the method of least squares. As illustrated in FIG. 12, if the aforesaid replacement by the mean value is not carried out, an incorrect relationship between the densities of the R and G two colors will often be obtained due to the biasing of the image signal components. However, with the embodiment of the method for adjusting gray balance in a photo printer in accordance with the present invention, relationship between the densities of the R and G two colors is calculated by using the set of the image signal components (DR", DG") having been obtained from the aforesaid replacement by the mean value. Therefore, the problems described above do not occur.

In a step P14, in cases where the relationship between the densities of the R and G two colors is given by the formula $Y=\alpha_1 \cdot X+\beta_1$ on the X-Y coordinate system, the first image processing unit 54 does not carry out any transform on the original image signal DG and linearly transforms the image signal DR into an image signal DRc, which is represented by the formula $DRc=\alpha_1 \cdot DR+\beta_1$. As a result, the image signal components of the image signal DG and the image signal DRc having been obtained from the linear transform, which image signal components correspond to the gray object, represent an identical density.

Also, in the same manner as that described above, the relationship between the densities of the B and G two colors is calculated from the set of the image signal components (DB", DG") with respect to the B and G two colors, the shadow point DBs and the highlight point DBh, which have been calculated with respect to the image signal components DB', and the shadow point DGs and the highlight point DGh, which have been calculated with respect to the image signal components DG'.

Further, in cases where the relationship between the densities of the B and G two colors is given by the formula $Y=\alpha_3 \cdot X+\beta_3$ on the X-Y coordinate system, the first image processing unit 54 does not carry out any transform on the original image signal DG and linearly transforms the image signal DB into an image signal DBc, which is represented by the formula $DBc=\alpha_3 \cdot DB+\beta_3$. As a result, the image signal components of the image signal DG and the image signal DBC having been obtained from the linear transform, which image signal components correspond to the gray object, represent an identical density.

In the embodiment described above, the linear transform is not carried out on the image signal DG. Alternatively, all of the image signals DR, DG, and DB may be subjected to the linear transforms, and the image signals DRc, DGc, and DBc may be obtained from the linear transforms such that their image signal components corresponding to the gray object may represent an identical density. However, in cases where the image signal DG is not subjected to the linear transform and is taken as the reference, the processing can be prevented from becoming redundant.

In the embodiment described above, the image signals DR and DB are subjected to the linear transforms, and the gray balance is thereby adjusted. Therefore, the gray balance can be kept even in cases where, as described above with reference to FIGS. 14A through 14D and FIG. 15, the gray balance cannot be kept over the entire range of the exposure amount by merely adding appropriate bias components to the R, G, and B image signals.

Further, in the aforesaid embodiment, as described above, in the step for calculating the relationship between the densities of the R and G two colors, the picture elements belonging to the R-C hues and the G-M hues, which are apt to cause a color failure to occur, are eliminated, and the relationship between the densities of the R and G two colors is calculated from the image signal components representing the picture elements belonging to the B-Y hues. Also, in the step for calculating the relationship between the densities of the B and G two colors, the picture elements belonging to the B-Y hues and the G-M hues, which are apt to cause a color failure to occur, are eliminated, and the relationship between the densities of the B and G two colors is calculated from the image signal components representing the picture elements belonging to the R-C hues. Therefore, the color failure can be prevented reliably.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for adjusting gray balance in a photo printer, wherein each of three color light beams is modulated with one of image signals D1, D2, and D3, where each of 1, 2, and 3 corresponds to one of red, green, and blue, the image signals having been obtained by reading out an image recorded on color film, each of the image signals being made up of a series of image signal components which represent corresponding color densities at picture elements of the image, wherein a color photosensitive material is scanned with the modulated light beams, and wherein a color image is thereby reproduced on the color photosensitive material, the image signal components of the image signals D1, D2, and D3 corresponding to a gray object being adjusted to represent an identical density, the method comprising the steps of:

i) calculating chrominance information at respective picture elements from the image signals D1, D2, and D3;

ii) eliminating from the image signals D1, D2 and D3 image signal components representing a high-saturation picture element, which has a saturation higher than a first predetermined value, and picture elements, which are adjacent to the high-saturation picture element and which have hues such that differences between hues of the adjacent picture elements and a hue of the high-saturation picture element may be equal to at most a second predetermined value, the image signals D1, D2, and D3 which have not been eliminated being designated as image signal components D1', image signal components D2', and image signal components D3', which represent low-saturation picture elements;

iii) calculating a shadow point D1s and a highlight point D1h of the image signal components D1', a shadow point D2s and a highlight point D2h of the image signal components D2', and a shadow point D3s and a highlight point D3h of the image signal components D3';

iv) correcting at least one of the high light points D1h, D2h, and D3h such that dynamic ranges from the shadow points to the highlight points for the respective colors become identical with one another when differences among the dynamic ranges for the respective colors are larger than a predetermined allowable value;

v) obtaining a set of image signal components (D1", D2") by
    grouping pairs of the image signal components (D1', D2') as counterpart pairs, each of which pairs corresponds to a single picture element, a respective counterpart of each of the pairs of the image signal components (D1', D2') having an identical value,
    calculating a first mean value of values of respective other counterparts of each of the pairs of the image signal components (D1', D2'), and
    replacing the values of the respective other counterparts of each of the pairs of the image signal components (D1', D2') with the calculated first mean value;

vi) obtaining a set of image signal components (D3", D2") by
    grouping pairs of the image signal components (D3', D2') as counterpart pairs, each of which pairs corresponds to a single picture element, a respective counterpart of each of the pairs of the image signal components (D3', D2') having an identical value,
    calculating a second mean value of values of respective other counterparts of each of the pairs of the image signal components (D3', D2'), and
    replacing the values of the respective other counterparts of each of the pairs of the image signal components (D3', D2') with the calculated second mean value;

vii) calculating a first relationship between densities of two colors which correspond to the set of image signal components (D1", D2"), from the set of image signal components (D1", D2") with respect to the two colors, the shadow points D1s, D2s, and the highlight points D1h, D2h;

viii) carrying out a linear transform of at least one of the image signals D1 and D2 in accordance with the calculated first relationship between the densities of the two colors, which correspond to the set of image signal components (D1", D2"), such that the at least one of the image signals D1 and D2 becomes identical with another of the at least one of the image signals D1 and D2 over all of the dynamic range;

ix) calculating a second relationship between densities of respective two colors which correspond to the set of image signal components (D3", D2"), from the set of image signal components (D3", D2") with respect to the respective two colors, the shadow points D3s, D2s, and the highlight points D3h, D2h; and x) carrying out a linear transform of at least one of the image signals D3 and D2 in accordance with the calculated second relationship between the densities of the respective two colors, which correspond to the set of image signal components (D3", D2"), such that the at least one of the image signals D3 and D2 becomes identical with another of the at least one of the image signals D3 and D2 over all of the dynamic range.

2. The method as defined in claim 1, further comprising:
carrying out γ (gamma) conversion processing, prior to said step i), for fixing conversion characteristics for each color on at least one of the image signals D1, D2, and D3, such that differences among the densities represented by the image signal components of the image signals D1, D2, and D3, which image signal components correspond to the gray object, become approximately equal to predetermined values regardless of exposure amounts.

3. The method as defined in claim 1, wherein the picture elements belonging to a specific first hue are selected from the low-saturation picture elements,
the pairs of the image signal components (D1', D2') corresponding to the image signal components D1', D2', and D3' representing the selected picture elements belonging to the first hue,
the picture elements belonging to a specific second hue, which is different from the first hue, are selected from the low-saturation picture elements, and
the pairs of the image signal components (D3', D2') corresponding to the image signal components D1', D2', and D3' representing the selected picture elements belonging to the second hue.

4. The method as defined in claim 2, wherein the picture elements belonging to a specific first hue are selected from the low-saturation picture elements,
the pairs of the image signal components (D1', D2') corresponding to the image signal components D1', D2', and D3' representing the selected picture elements belonging to the first hue,
the picture elements belonging to a specific second hue, which is different from the first hue, are selected from the low-saturation picture elements, and
the pairs of the image signal components (D3', D2') corresponding to the image signal components D1', D2', and D3' representing the selected picture elements belonging to the second hue.

5. The method as defined in claim 3, wherein when the image signal D1 represents red density, the image signal D2 represents green density, and the image signal D3 represents blue density, the picture elements belonging to blue-yellow hues are selected as the picture elements belonging to the first hue and the picture elements belonging to red-cyan hues are selected as the picture elements belonging to the second hue.

6. The method as defined in claim 4, wherein when the image signal D1 represents red density, the image signal D2 represents green density, and the image signal D3 represents blue density, the picture elements belonging to blue-yellow hues are selected as the picture elements belonging to the first hue and the picture elements belonging to red-cyan hues are selected as the picture elements belonging to the second hue.

7. The method as defined in claim 1, wherein the linear transforms are carried out in said steps viii) and x) such that
(a) the calculated first relationship between the densities of the two colors corresponding to the set of image signal components (D1", D2"), calculated from the set of image signal components (D1", D2") with respect to the two colors, the shadow points D1s, D2s and the highlight points D1h, D2h is given by $Y=\alpha_1 \cdot X+\beta_1$ on an X-Y coordinate system having the image signal component D1" as the X-coordinate, the image signal component D2" as the Y-coordinate, $\alpha_1$ as a slope and $\beta_1$ as a Y-intercept,
the image signal D2 not being transformed and the image signal D1 being linearly transformed into an image signal D1c, which is represented by $D1c=\alpha_1 \cdot D1+\beta_1$, and
(b) the calculated second relationship between the densities of the two colors corresponding to the set of image signal components (D3", D2"), calculated from the set of image signal components (D3", D2") with respect to the two colors, the shadow points D3s, D2s, and the highlight points D3h, D2h, is given by $Y=\alpha_3 \cdot X+\beta_3$ on another X-Y coordinate system having the image signal component D3" as the X-coordinate, the image signal component D2" as the Y-coordinate, $\alpha_3$ as a slope and as $\beta_3$ as a Y-intercept,
the image signal D2 not being transformed and the image signal D3 being linearly transformed into an image signal D3c, which is represented by $D3c=\alpha_3 \cdot D3+\beta_3$.

8. The method as defined in claim 2, wherein the linear transforms in said steps viii) and x) are carried out such that
(a) the calculated first relationship between the densities of the two colors corresponding to the set of image signal components (D1", D2"), calculated from the set of image signal components (D1", D2") with respect to the two colors, the shadow points D1s, D2s, and the highlight points D1h, D2h, is given by $Y=\alpha_1 \cdot X+\beta_1$ on an X-Y coordinate system having the image signal component D1" as the X-coordinate, the image signal component D2" as the Y-coordinate, $\alpha_1$ as a slope and $\beta_1$ as a Y-intercept,
the image signal D2 not being transformed and the image signal D1 being linearly transformed into an image signal D1c, which is represented by $D1c=\alpha_1 \cdot D1+\beta_1$, and
(b) the calculated second relationship between the densities of the two colors corresponding to the set of image signal components (D3", D2"), calculated from the set of image signal components (D3", D2") with respect to the two colors, the shadow points D3s, D2s, and the highlight points D3h, D2h, is given by $Y=\alpha_3 \cdot X+\beta_3$ on another X-Y coordinate system having the image signal component D3" as the X-coordinate, the image signal component D2" as the Y-coordinate, $\alpha_3$, as a slope and $\beta_3$ as a Y-intercept, the image signal D2 not being transformed and the image signal D3 being linearly transformed into an image signal D3c, which is represented by the formula D3c= $\alpha_3 \cdot D3 + \beta_3$.

9. The method as defined in claim 3, wherein the linear transforms in said steps viii) and x) are carried out such that (a) the calculated first relationship between the densities of the two colors corresponding to the set of image signal components (D1", D2"), calculated from the set of image signal components (D1", D2") with respect to the two colors, the shadow points D1s, D2s, and the highlight points D1h, D2h, is given by $Y=\alpha_1 \cdot X + \beta_1$ on an X-Y coordinate system having the image signal component D1" as the X-coordinate, the image signal component D2" as the Y-coordinate, $\alpha_1$ as a slope and $\beta_1$ as a Y-intercept, the image signal D2 not being transformed and the image signal D1 being linearly transformed into an image signal D1c, which is represented by $D1c=\alpha_1 \cdot D1 + \beta_1$, and (b) the calculated second relationship between the densities of the two colors corresponding to the set of image signal components (D3", D2"), calculated from the set of image signal components (D3", D2") with respect to the two colors, the shadow points D3s, D2s, and the highlight points D3h, D2h, is given by $Y=\alpha_3 \cdot X + \beta_3$ on another X-Y coordinate system having the image signal component D3" as the X-coordinate, the image signal component D2" as the Y-coordinate, $\alpha_3$ as a slope and $\beta_3$ as a Y-intercept, the image signal D2 not being transformed and the image signal D3 being linearly transformed into an image signal D3c, which is represented by the formula D3c= $\alpha_3 \cdot D3 + \beta_3$.

10. The method as defined in claim 4, wherein the linear transforms in said steps viii) and x) are carried out such that (a) the calculated first relationship between the densities of the two colors corresponding to the set of image signal components (D1", D2"), calculated from the set of image signal components (D1", D2") with respect to the two colors, the shadow points D1s, D2s, and the highlight points D1h, D2h, is given by $Y=\alpha_1 \cdot X + \beta_1$ on an X-Y coordinate system having the image signal component D1" as the X-coordinate, the image signal component D2" as the Y-coordinate, $\alpha_1$ as a slope and $\beta_1$ as a Y-intercept, the image signal D2 not being transformed and the image signal D1 being linearly transformed into an image signal D1c, which is represented by $D1c=\alpha_1 \cdot D1 + \beta_1$, and (b) the calculated second relationship between the densities of the two colors corresponding to the set of image signal components (D3", D2"), calculated from the set of image signal components (D3", D2") with respect to the two colors, the shadow points D3s, D2s, and the highlight points D3h, D2h, is given by $Y=\alpha_3 \cdot X + \beta_3$ on another X-Y coordinate system having the image signal component D3" as the X-coordinate, the image signal component D2" as the Y-coordinate, $\alpha_3$ as a slope and $\beta_3$ as a Y-intercept, the image signal D2 not being transformed and the image signal D3 being linearly transformed into an image signal D3c, which is represented by the formula D3c= $\alpha_3 \cdot D3 + \beta_3$.

11. The method as defined in claim 5, wherein the linear transforms in said steps viii) and x) are carried out such that (a) the calculated first relationship between the densities of the two colors corresponding to the set of image signal components (D1", D2"), calculated from the set of image signal components (D1", D2") with respect to the two colors, the shadow points D1s, D2s, and the highlight points D1h, D2h, is given by $Y=\alpha_1 \cdot X + \beta_1$ on an X-Y coordinate system having the image signal component D1" as the X-coordinate, the image signal component D2" as the Y-coordinate, $\alpha_1$ as a slope and $\beta_1$, as a Y-intercept, the image signal D2 not being transformed and the image signal D1 being linearly transformed into an image signal D1c, which is represented by $D1c=\alpha_1 \cdot D1 + \beta_1$, and (b) the calculated second relationship between the densities of the two colors corresponding to the set of image signal components (D3", D2"), calculated from the set of image signal components (D3", D2") with respect to the two colors, the shadow points D3s, D2s, and the highlight points D3h, D2h, is given by $Y=\alpha_3 \cdot X + \beta_3$ on another X-Y coordinate system having the image signal component D3" as the X-coordinate, the image signal component D2" as the Y-coordinate, $\alpha_3$ as a slope and $\beta_3$ as a Y-intercept, the image signal D2 not being transformed and the image signal D3 being linearly transformed into an image signal D3c, which is represented by the formula D3c= $\alpha_3 \cdot D3 + \beta_3$.

12. The method as defined in claim 6, wherein the linear transforms in said steps viii) and x) are carried out such that (a) the calculated first relationship between the densities of the two colors corresponding to the set of image signal components (D1", D2"), calculated from the set of image signal components (D1", D2") with respect to the two colors, the shadow points D1s, D2s, and the highlight points D1h, D2h, is given by $Y=\alpha_1 \cdot X + \beta_1$ on an X-Y coordinate system having the image signal component D1" as the X-coordinate, the image signal component D2" as the Y-coordinate, $\alpha_1$ as a slope and $\beta_1$ as a Y-intercept, the image signal D2 not being transformed and the image signal D1 being linearly transformed into an image signal D1c, which is represented by $D1c=\alpha_1 \cdot D1 + \beta_1$, and (b) the calculated second relationship between the densities of the two colors corresponding to the set of image signal components (D3", D2"), calculated from the set of image signal components (D3", D2") with respect to the two colors, the shadow points D3s, D2s, and the highlight points D3h, D2h, is given by $Y=\alpha_3 \cdot X + \beta_3$ on another X-Y coordinate system having the image signal component D3" as the X-coordinate, the image signal component D2" as the Y-coordinate, $\alpha_3$ as a slope and $\beta_3$ as a Y-intercept, the image signal D2 not being transformed and the image signal D3 being linearly transformed into an image signal D3c, which is represented by the formula D3c= $\alpha_3 \cdot D3 + \beta_3$.

13. The method as defined in claim 1, wherein the color film is color negative film, and the image signals D1, D2, and D3 are obtained by detecting reading light having passed through the color negative film.

14. The method as defined in claim 2, wherein the color film is color negative film, and the image signals D1, D2, and D3 are obtained by detecting reading light having passed through the color negative film.

15. The method as defined in claim 3, wherein the color film is color negative film, and the image signals D1, D2, and D3 are obtained by detecting reading light having passed through the color negative film.

16. The method as defined in claim 4, wherein the color film is color negative film, and the image signals D1, D2, and D3 are obtained by detecting reading light having passed through the color negative film.

17. The method as defined in claim 5, wherein the color film is color negative film, and the image signals D1, D2, and D3 are obtained by detecting reading light having passed through the color negative film.

18. The method as defined in claim 6, wherein the color film is color negative film, and the image signals D1, D2, and D3 are obtained by detecting reading light having passed through the color negative film.

19. The method as defined in claim 7, wherein the color film is color negative film, and the image signals D1, D2, and D3 are obtained by detecting reading light having passed through the color negative film.

20. The method as defined in claim 8, wherein the color film is color negative film, and the image signals D1, D2, and D3 are obtained by detecting reading light having passed through the color negative film.

21. The method as defined in claim 9, wherein the color film is color negative film, and the image signals D1, D2, and D3 are obtained by detecting reading light having passed through the color negative film.

22. The method as defined in claim 10, wherein the color film is color negative film, and the image signals D1, D2, and D3 are obtained by detecting reading light having passed through the color negative film.

23. The method as defined in claim 11, wherein the color film is color negative film, and the image signals D1, D2, and D3 are obtained by detecting reading light having passed through the color negative film.

24. The method as defined in claim 12, wherein the color film is color negative film, and the image signals D1, D2, and D3 are obtained by detecting reading light having passed through the color negative film.

25. A method for adjusting gray balance in a photo printer, wherein each of three color light beams is modulated with one of image signals D1, D2, and D3, where each of 1, 2, and 3 corresponds to one of red, green, and blue, the image signals having been obtained by reading out an image recorded on color film, each of the image signals being made up of a series of image signal components which represent corresponding color densities at picture elements of the image, wherein a color photosensitive material is scanned with the modulated light beams, and wherein a color image is thereby reproduced on the color photosensitive material, the image signal components of the image signals D1, D2, and D3 corresponding to a gray object being adjusted to represent an identical density, the method comprising the steps of:
  i) calculating chrominance information at respective picture elements from the image signals D1, D2, and D3;
  ii) eliminating from the image signals D1, D2 and D3 image signal components representing a high-saturation picture element, which has a saturation higher than a first predetermined value, and picture elements, which are adjacent to the high-saturation picture element and which have hues such that differences between hues of the adjacent picture elements and a hue of the high-saturation picture element may be equal to at most a second predetermined value, the image signals D1, D2, and D3 which have not been eliminated being designated as image signal components D1', image signal components D2', and image signal components D3', which represent low-saturation picture elements; and
  iii) carrying out a linear transform of at least one of the image signals D1, D2, and D3 such that the image signal components corresponding to the gray object represent an identical density, in accordance with distribution characteristics of the image signal components D1', D2', and D3'.

26. A method for adjusting gray balance in a photo printer, wherein each of three color light beams is modulated with one of image signals D1, D2, and D3, where each of 1, 2, and 3 corresponds to one of red, green, and blue, the image signals having been obtained by reading out an image recorded on color film, each of the image signals being made up of a series of image signal components which represent corresponding color densities at picture elements of the image, wherein a color photosensitive material is scanned with the modulated light beams, and wherein a color image is thereby reproduced on the color photosensitive material, the image signal components of the image signals D1, D2, and D3 corresponding to a gray object being adjusted to represent an identical density, the method comprising the steps of:
  i) calculating chrominance information at respective picture elements from the image signals D1, D2, and D3;
  ii) obtaining image signal components D1', image signal components D2', and image signal components D3', which represent low-saturation picture elements having a saturation lower than a predetermined value;
  iii) calculating a shadow point D1$s$ and a highlight point of D1$h$ of the corresponding color of the image signal components D1', a shadow point D2$s$ and a highlight point D2$h$ of the corresponding color of the image signal components D2', and a shadow point D3$s$ and a highlight point D3$h$ of the corresponding color of the image signal components D3';
  iv) calculating a first relationship between densities of two colors which correspond to a set of the image signal components (D1', D2') from among the image signal components D1', D2', and D3', from the set of the image signal components (D1', D2'), with respect to the two colors, the shadow points D1$s$, D2$s$, and the highlight points D1$h$, D2$h$;
  v) carrying out a linear transform of at least one of the image signals D1 and D2 in accordance with the calculated first relationship between the densities of the two colors, which correspond to the set of the image signal components (D1', D2'), such that the at least one of the image signals D1 and D2 becomes identical with another of the at least one of the image signals D1 and D2 over an entire range between the shadow points D1$s$, D2$s$ and the highlight points D1$h$, D2$h$;
  vi) calculating a second relationship between the densities of respective two colors which correspond to a set of the image signal components (D3', D2'), from the set of the image signal components (D3', D2') with respect to the respective two colors, the shadow points D3$s$, D2$s$, and the highlight points D3$h$, D2$h$; and vii) carrying out a linear transform of at least one of the image signals D3 and D2 in accordance with the calculated second relationship between the densities of the respective two colors, which correspond to the set of image signal components (D3', D2'), such that the at least one of the image signals D3 and D2 becomes identical with another of the at least one of the image signals D3 and D2 over an entire range between the shadow point D3$s$, D2$s$ and the highlight points D3$h$, D2$h$.

27. A method for adjusting gray balance in a photo printer, wherein each of three color light beams is modulated with one of image signals D1, D2, and D3, where each of 1, 2, and 3 corresponds to one of red, green, and blue, the image signals having been obtained by reading out an image recorded on color film, each of the image signals being made up of a series of image signal components which represent corresponding color densities at picture elements of the image, wherein a color photosensitive material is scanned with the modulated light beams, and wherein a color image is thereby reproduced on the color photosensitive material, the image signal components of the image signals D1, D2, and D3 corresponding to a gray object being adjusted to represent an identical density, the method comprising the steps of:
   i) calculating chrominance information at respective picture elements from the image signals D1, D2, and D3;
   ii) obtaining image signal components D1', image signal components D2', and image signal components D3', which represent low-saturation picture elements having a saturation lower than a predetermined value;
   iii) selecting picture elements, which belong to a specific first hue, from said low-saturation picture elements;
   iv) obtaining pairs of the image signal components (D1', D2') with respect to two colors, from the image signal components D1', D2', and D3', which represent the selected picture elements belonging to said first hue;
   v) selecting picture elements, which belong to a specific second hue different from said first hue, from said low-saturation picture elements;
   vi) obtaining pairs of the image signal components (D3', D2') with respect to respective two colors from the image signal components D1', D2', and D3', which represent the selected picture elements belonging to said second hue;
   vii) carrying out a linear transform of at least one of the image signals D1 and D2 in accordance with distribution characteristics of the pairs of the image signal components (D1', D2') such that said one of the image signals D1 and D2 becomes identical with another one of the image signals D1 and D2 over an entire range of exposure; and
   viii) carrying out a linear transform of at least one of the image signals D3 and D2 in accordance with distribution characteristics of the pairs of the image signal components (D3', D2') such that said one of the image signals D3 and D2 becomes identical with another one of the image signals over an entire range of exposure.

28. A method for adjusting gray balance in a photo printer, wherein each of three color light beams is modulated with one of image signals D1, D2, and D3, where each of 1, 2, and 3 corresponds to one of red, green, and blue, the image signals having been obtained by reading out an image recorded on color film, each of the image signals being made up of a series of image signal components which represent corresponding color densities at picture elements of the image, wherein a color photosensitive material is scanned with the modulated light beams, and wherein a color image is thereby reproduced on the color photosensitive material, the image signal components of the image signals D1, D2, and D3 corresponding to a gray object being adjusted to an identical density, the method comprising the steps of:
   i) calculating chrominance information at respective picture elements from the image signals D1, D2, and D3;
   ii) obtaining image signal components D1', image signal components D2', and image signal components D3', which represent low-saturation picture elements having a saturation lower than a predetermined value;
   iii) obtaining a set of image signal components (D1", D2") by
   grouping pairs of the image signal components (D1', D2') as counterpart pairs, each of which pairs corresponds to a single picture element, a respective counterpart of each of the pairs of the image signal components (D1', D2') having an identical value,
   calculating a first mean value of values of respective other counterparts of each of the pairs of the image signal components (D1', D2'), and
   replacing the values of the respective other counterparts of each of the pairs of the image signal components (D1', D2') with the calculated first mean value;
   iv) obtaining a set of image signal components (D3", D2") by
   grouping pairs of the image signal components (D3', D2') as counterpart pairs, each of which pairs corresponds to a single picture element, a respective counterpart of each of the pairs of the image signal components (D3', D2') having an identical value,
   calculating a second mean value of values of respective other counterparts of each of the pairs of the image signal components (D3', D2'), and
   replacing the values of the respective other counterparts of each of the pairs of the image signal components (D3', D2') with the calculated second mean value;
   v) carrying out a linear transform of at least one of the image signals D1 and D2 in accordance with distribution characteristics of the set of image signal components (D1", D2") such that said one of the image signals D1 and D2 becomes identical with another one of the image signals D1 and D2 over an entire range of exposure; and
   vi) carrying out a linear transform of at least one of the image signals D3 and D2 in accordance with distribution characteristics of the set of image signal components (D3", D2") such that said one of the image signals D3 and D2 becomes identical with another one of the image signals over an entire range of exposure.

29. A method for adjusting gray balance in a photo printer, wherein each of three color light beams is modulated with one of image signals D1, D2, and D3, where each of 1, 2, and 3 corresponds to one of red, green, and blue, the image signals having been obtained by reading out an image recorded on color film, each of the image signals being made up of a series of image signal components which represent corresponding color densities at picture elements of the image, wherein a color photosensitive material is scanned with the modulated light beams, and wherein a color image is thereby reproduced on the color photosensitive material, the image signal components of the image signals D1, D2 and D3 corresponding to a gray object being adjusted to represent an identical density, the method comprising the steps of:

i) calculating chrominance information at respective picture elements from the image signals D1, D2, and D3;

ii) eliminating from the image signals D1, D2 and D3 image signal components representing a high-saturation picture element, which has a saturation higher than a first predetermined value, and picture elements, which are adjacent to the high-saturation picture element and which have hues such that differences between hues of the adjacent picture elements and a hue of the high-saturation picture element may be equal to at most a second predetermined value, the image signals D1, D2, and D3 which have not been eliminated being designated as image signal components D1', image signal components D2', and image signal components D3', which represent low-saturation picture elements;

iii) calculating a shadow point D1$s$ and a highlight point D1$h$ of the image signal components D1', a shadow point D2$s$ and a highlight point D2$h$ of the image signal components D2', and a shadow point D3$s$ and a highlight point D3$h$ of the image signal components D3';

iv) correcting at least one of the highlight points D1$h$, D2$h$, and D3$h$ such that dynamic ranges from the shadow points to the highlight points for the respective colors become identical with one another when differences among the dynamic ranges for the respective colors are larger than a predetermined allowable value;

v) calculating a first relationship between densities of two corresponding colors from the shadow points D1$s$, D2$s$ and the highlight points D1$h$, D2$h$;

vi) carrying out a linear transform of at least one of the image signals D1 and D2 in accordance with the calculated first relationship between the densities of the two corresponding colors, the first relationship having been calculated from the shadow points D1$s$, D2$s$ and the highlight points D1$h$, D2$h$ such that said one of the image signals D1 and D2 becomes identical with another one of the image signals over the entire dynamic range of the two corresponding colors;

vii) calculating a second relationship between densities of two respective colors from the shadow points D3$s$, D2$s$ and the highlight points D3$h$, D2$h$; and viii) carrying out a linear transform of at least one of the image signals D3 and D2 in accordance with the calculated second relationship between the densities of the two respective colors, the second relationship having been calculated from the shadow points D3$s$, D2$s$ and the highlight points D3$h$, D2$h$ such that said one of the image signals D3 and D2 becomes identical with another one of the image signals over the entire dynamic range of the two respective colors.

30. A method for adjusting gray balance in a photo printer, wherein each of three color light beams is modulated with one of image signals D1, D2, and D3, where each of 1, 2, and 3 corresponds to one of red, green, and blue, the image signals having been obtained by reading out an image recorded on color film, each of the image signals being made up of a series of image signal components which represent corresponding color densities at picture elements of the image, wherein a color photosensitive material is scanned with the modulated light beams, and wherein a color image is thereby reproduced on the color photosensitive material, the image signal components of the image signals D1, D2, and D3 corresponding to a gray object being adjusted to represent an identical density, the method comprising the steps of:

i) carrying out $\gamma$ (gamma) conversion processing for fixing conversion characteristics for each color, on at least one of the image signals D1, D2, and D3, such that differences among the densities represented by the image signal components of the image signals D1, D2, and D3, which image signal components correspond to the gray object, become approximately equal to predetermined values regardless of exposure amounts;

ii) obtaining image signal components D1', image signal components D2', and image signal components D3', which represent low-saturation picture elements, from the converted image signals D1, D2, and D3 obtained in said step i); and iii) carrying out a linear transform of at least one of the image signals D1, D2, and D3, such that the image signal components of the image signals D1, D2, and D3 corresponding to the gray object represent the identical density, said linear transform being carried out in accordance with distribution characteristics of said image signal components D1', D2', and D3'.

* * * * *